(12) United States Patent
Schulte, II

(10) Patent No.: US 12,448,361 B2
(45) Date of Patent: Oct. 21, 2025

(54) METHOD FOR PURIFICATION OF A BISPHENOL A DIANHYDRIDE COMPOSITION, BISPHENOL A DIANHYDRIDE COMPOSITION, POLY(ETHERIMIDE) DERIVED FROM THE BISPHENOL A DIANHYDRIDE COMPOSITION, AND ARTICLES PREPARED THEREFROM

(71) Applicant: SHPP GLOBAL TECHNOLOGIES B.V., Bergen op Zoom (NL)

(72) Inventor: James Patrick Schulte, II, Mt. Vernon, IN (US)

(73) Assignee: SHPP GLOBAL TECHNOLOGIES B.V., Bergen op Zoom (NL)

( * ) Notice: Subject to any disclaimer, the term of this patent is extended or adjusted under 35 U.S.C. 154(b) by 1116 days.

(21) Appl. No.: 17/418,446

(22) PCT Filed: Jan. 30, 2020

(86) PCT No.: PCT/US2020/015807
§ 371 (c)(1),
(2) Date: Jun. 25, 2021

(87) PCT Pub. No.: WO2020/160215
PCT Pub. Date: Aug. 6, 2020

(65) Prior Publication Data
US 2022/0017481 A1    Jan. 20, 2022

(30) Foreign Application Priority Data

Jan. 31, 2019 (EP) ..................................... 19154904

(51) Int. Cl.
| C07D 307/89 | (2006.01) |
| B01D 9/00 | (2006.01) |
| B01D 39/16 | (2006.01) |
| C08G 73/10 | (2006.01) |

(52) U.S. Cl.
CPC ......... *C07D 307/89* (2013.01); *B01D 9/0054* (2013.01); *B01D 39/1669* (2013.01); *C08G 73/1014* (2013.01); *C08G 73/1053* (2013.01); *C08G 73/1071* (2013.01); *B01D 2009/0086* (2013.01); *B01D 2201/184* (2013.01)

(58) Field of Classification Search
CPC ............... C07D 307/89; B01D 9/0054; B01D 39/1669; B01D 2009/0086; B01D 2201/184; C08G 73/1014; C08G 73/1053; C08G 73/1071
See application file for complete search history.

(56) References Cited

U.S. PATENT DOCUMENTS

| 3,833,546 A | 9/1974 | Takekoshi et al. |
| 3,838,097 A | 9/1974 | Wirth et al. |
| 3,847,867 A | 11/1974 | Heath et al. |
| 3,850,964 A | 11/1974 | Williams, III |
| 3,879,428 A | 4/1975 | Heath et al. |
| 3,905,942 A | 9/1975 | Takekoshi et al. |
| 4,011,198 A | 3/1977 | Takekoshi et al. |
| 4,293,683 A | 10/1981 | Takekoshi et al. |
| 7,495,113 B2 | 2/2009 | Pressman et al. |
| 2006/0066004 A1 | 3/2006 | Richards et al. |
| 2006/0205958 A1 | 9/2006 | Brunelle et al. |
| 2006/0293528 A1 | 12/2006 | Stella et al. |
| 2007/0073035 A1 | 3/2007 | Stella et al. |
| 2007/0073066 A1 | 3/2007 | Stella et al. |
| 2007/0117990 A1 | 5/2007 | Pressman et al. |
| 2014/0094536 A1 | 4/2014 | Guggenheim et al. |
| 2022/0073445 A1 | 3/2022 | Schulte et al. |
| 2022/0073483 A1 | 3/2022 | Schulte et al. |
| 2022/0162386 A1 | 5/2022 | Patil et al. |
| 2023/0167242 A1 | 6/2023 | Johnson et al. |

FOREIGN PATENT DOCUMENTS

| CN | 1850814 A | 10/2006 |
| CN | 104529966 A | 4/2015 |
| CN | 106279085 A | 1/2017 |
| CN | 108148029 A | 6/2018 |
| JP | 2005060328 | 3/2005 |

(Continued)

OTHER PUBLICATIONS

Eichstadt, Macromolecules, 2002, vol. 35, 7561-7568. (Year: 2002).*
Mi, Polymers, 2019, vol. 11 (854), 1-19. (Year: 2019).*
International Search Report for International Application No. PCT/US2020/063080, International Filing Date: Dec. 3, 2020, Date of Mailing: Apr. 9, 2021; 4 pages.
International Search Report for the corresponding International Application No. PCT/US2020/015807; International Filing Date: Jan. 31, 2020; Date of Mailing: Jun. 23, 2020; 8 pages.

(Continued)

*Primary Examiner* — D Margaret M Seaman
(74) *Attorney, Agent, or Firm* — CANTOR COLBURN LLP

(57) ABSTRACT

A method for the purification of a bisphenol A dianhydride composition includes contacting the bisphenol A dianhydride composition with a halogenated solvent to form a solution, and one or more of filtering the solution to remove ionic species; washing the solution with aqueous media to remove ionic species; crystallizing bisphenol A dianhydride from the solution to remove ionic species; and contacting the solution with an adsorbent to remove ionic species. A purified bisphenol A dianhydride composition is also described. The bisphenol A dianhydride composition can be used in the preparation of a poly(etherimide), and poly(etherimides) made from the bisphenol A dianhydride composition can be useful for forming a variety of articles.

11 Claims, 4 Drawing Sheets

(56) References Cited

FOREIGN PATENT DOCUMENTS

| WO | 2009015383 A2 | 1/2009 |
| --- | --- | --- |
| WO | 2017117343 A1 | 7/2017 |
| WO | 2017132656 A1 | 8/2017 |
| WO | 2017172593 A1 | 10/2017 |

OTHER PUBLICATIONS

Liou, G. et al., "New Organo-Soluble Aromatic Polyimides Based on 3,3', 5, 5'-Tetrabromo-2,2-bis[4-(3,4-dicarboxyphenoxy)phenyl]propane Dianhydride and Aromatic Diamines", Journal of Polymer Science: Part: A: Polymer Chemistry, vol. 37, 1993; pp. 1673-1680.

Written Opinion for International Application No. PCT/US2020/063080, International Filing Date: Dec. 3, 2020, Date of Mailing: Apr. 9, 2021; 6 pages.

Written Opinion for the corresponding International Application No. PCT/US2020/015807; International Filing Date: Jan. 31, 2020; Date of Mailing: Jun. 23, 2020; 12 pages.

Guey-Sheng et al., "New Organo-Soluble Aromatic Polyimides Based on 3,3*,5,5*-Tetrabromo-2,2-bis[4-(3,4-dicarboxyphenoxy)phenyl]propane Dianhydride and Aromatic Diamines", Journal of Polymer Science: Part A; Polymer Chemistry, vol. 37, 1999; pp. 1673-1680.

Farr, "Chapter 3 Experimental", Thesis; 58 pages.

Farr, "Synthesis and Characterization of Novel Polyimide Gas Separation Membrane Material Systems", Virginia Tech., 1999; 3 pages (Abstract).

Tan, Biao, "Synthesis and Characterization of Phenylethynyl Endcapped Polyetherimide Oligomers", Dissertation, Mar. 1997; 281 pages.

\* cited by examiner

METHOD FOR PURIFICATION OF A BISPHENOL A DIANHYDRIDE COMPOSITION, BISPHENOL A DIANHYDRIDE COMPOSITION, POLY(ETHERIMIDE) DERIVED FROM THE BISPHENOL A DIANHYDRIDE COMPOSITION, AND ARTICLES PREPARED THEREFROM

CROSS REFERENCE TO RELATED APPLICATIONS

This application is a National Stage application of PCT/US2020/015807, filed Jan. 30, 2020, which claims the benefit of European patent application No. 19154904.7, filed on Jan. 31, 2019, the contents of both of which are hereby incorporated by reference in their entirety.

BACKGROUND

Poly(imides), and in particular, poly(etherimides) (PEI), are high performance polymers having a glass transition temperature (Tg) of greater 180° C. These polymers further have high strength, heat resistance, and modulus, and broad chemical resistance. Poly(etherimides) are widely used in applications as diverse as automotive and electrical/electronic applications since these compositions offer good mechanical and thermal properties.

Poly(etherimides) can be prepared by condensation polymerization, for example of a dianhydride with a diamine. In order to obtain good reaction kinetics, achieve high molecular weight, and provide a stable, processable polymer product, high purity monomer components are desirable. Additionally, some applications can require that the polymers have good optical clarity, and good thermal and mechanical properties. The level of haze exhibited by an article can be related to the method by which the polymer is prepared. In practice, it can be difficult to produce the desired dianhydrides that are substantially free of alkali metals and their salts.

Therefore, there is a need in the art for dianhydride monomers that are substantially free of residual phase transfer agents, sodium, potassium, calcium, zinc, aluminum, iron, titanium, phosphorus, phosphate, nitrate, nitrite, sulfate, and chloride ions. It would be a further advantage to provide poly(etherimides) that have low levels of such contaminants, and exhibit low haze, high optical clarity, good reaction kinetics during polymerization, high molecular weight, and behave as stable and processable polymers.

SUMMARY

A method for the purification of a bisphenol A dianhydride composition comprises contacting the bisphenol A dianhydride composition with a halogenated solvent to form a solution; and one or more of: filtering the solution to remove ionic species; washing the solution with aqueous media to remove ionic species; crystallizing bisphenol A dianhydride from the solution to remove ionic species; and contacting the solution with an adsorbent to remove ionic species; wherein the a bisphenol A dianhydride composition comprises a bisphenol A dianhydride of the formula

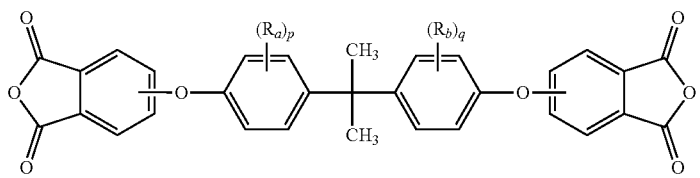

wherein $R^a$ and $R^b$ are each independently a halogen or a monovalent $C_{1-6}$ alkyl group and p and q are each independently an integer of 0 to 4, preferably wherein p and q are each 0; and at least one of sodium, potassium, calcium, zinc, aluminum, iron, titanium, phosphorus, phosphate, nitrate, nitrite, sulfate, and chloride ions.

A purified bisphenol A dianhydride comprises less than 25 ppm each of sodium ions, potassium ions, calcium ions, zinc ions, aluminum ions, iron ions, titanium ions, and phosphorus ions; and less than 50 ppm each of phosphate ions, sulfate ions, chloride ions, nitrate ions, and nitrite ions.

A poly(etherimide) comprising repeating units derived from polymerization of the purified bisphenol A dianhydride composition and an organic diamine.

An article comprising the poly(etherimide) represents another aspect of the present disclosure.

The above described and other features are exemplified by the following figures and detailed description.

BRIEF DESCRIPTION OF THE DRAWINGS

The following figures represent exemplary embodiments.

DETAILED DESCRIPTION

Figure 1:
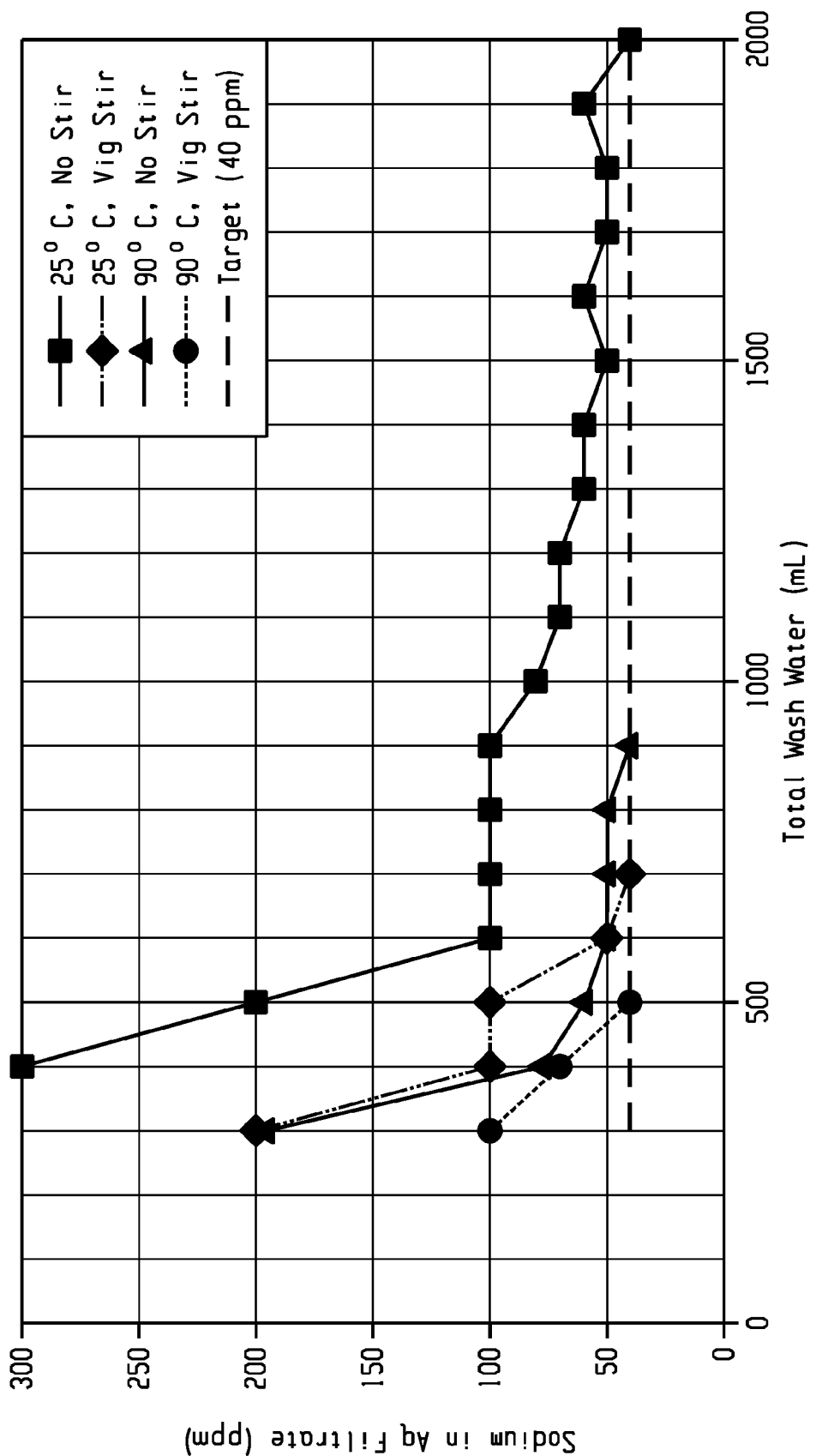
FIG. 1 shows the reduction in the amount of sodium ions vs. the total volume of water used for washing.

The present inventor has discovered an improved method for the purification of a bisphenol A dianhydride using a halogenated solvent. Advantageously, the highly pure bisphenol A dianhydrides can be prepared without the use of organic acids, organic anhydrides, or both, for example, acetic acid or acetic acid with acetic anhydride. The bisphenol A dianhydrides are substantially free from contaminants such as phase transfer agents and various inorganic ionic species including sodium, potassium, calcium, zinc, aluminum, titanium, iron, phosphorus, phosphate, nitrate, nitrite, sulfate, and chloride ions. The bisphenol A dianhydrides are particularly useful for the preparation of poly(etherimides) having desirable properties, including high heat performance, low water uptake, good mechanical properties, and improved flow at high shear.

Accordingly, an aspect of the present disclosure is a method for the purification of a bisphenol A dianhydride composition. In an aspect, the method disclosed herein is a method for the purification of a bisphenol A dianhydride composition comprising 60 weight percent or greater of a bisphenol A dianhydride, or 70 weight percent or greater of a bisphenol A dianhydride, or 80 weight percent or greater of a bisphenol A dianhydride, or 90 weight percent or greater of a bisphenol A dianhydride, each based on the total weight of the bisphenol A dianhydride composition. The bisphenol A dianhydride composition comprises a bisphenol A dianhydride of the formula

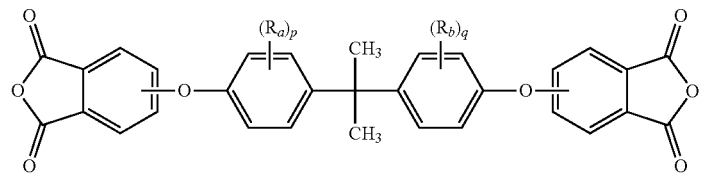

wherein $R^a$ and $R^b$ are each independently a halogen or a monovalent $C_{1-6}$ alkyl group and p and q are each independently an integer of 0 to 4, preferably wherein p and q are each 0. In some embodiments, p, q, or both can be 1 to 4, preferably 1 to 2, more preferably 1. In some embodiments, $R^a$ and $R^b$ can each independently be a $C_{1-3}$ alkyl group, for example a methyl group. The divalent bonds of the biphenol group can be in the 3,3' position, the 3,4' position, or the 4,4' position. Preferably, the divalent bonds of the biphenol group can be in the 3,3' position. In some embodiments, the bisphenol A dianhydride can be an isomer mixture. For example, 10-100 weight percent of the bisphenol A dianhydride have the divalent bonds of the bisphenol A group of the bisphenol A dianhydride are in the 3,3' position. Preferably, 90-100 weight percent of the bisphenol A dianhydride have the divalent bonds of the bisphenol A group of the bisphenol A dianhydride are in the 3,3' position.

In addition to the bisphenol A dianhydride, the bisphenol A dianhydride composition comprises at least one of sodium ions, potassium ions, calcium ions, zinc ions, aluminum ions, titanium ions, iron ions, phosphorus ions, phosphate ions, sulfate ions, phosphate ions, chloride ions, nitrate ions, and nitrite ions. For example, the bisphenol A dianhydride composition can comprise greater than 1000 ppm each of the foregoing ionic species, or greater than 5000 ppm, or greater than 10,000 ppm. In some embodiments, the bisphenol A dianhydride composition can comprise greater than or equal to 25 ppm, or greater than 100 ppm, or greater than 200 ppm sodium ions.

In some embodiments, the bisphenol A dianhydride composition can be made by a method comprising hydrolyzing a bisphenol A bisimide to form the corresponding bisphenol A tetraacid tetrasalt, quenching the bisphenol A tetraacid tetrasalt with a mineral acid to form the bisphenol A tetraacid, contacting the bisphenol A tetraacid with a halogenated solvent to form a reaction mixture; heating the reaction mixture to a temperature effective to form the corresponding bisphenol A dianhydride from the bisphenol A tetraacid, optionally in the presence of a mineral acid; and isolating the bisphenol A dianhydride from the reaction mixture. The method of making the bisphenol A dianhydride composition is preferably carried out in the absence of an organic acid, an organic acid anhydride, or both.

The method for purification of the bisphenol A dianhydride composition comprises contacting the bisphenol A dianhydride composition with a halogenated solvent to form a solution. In some embodiments, the halogenated solvent is an aromatic halogenated solvent, for example, ortho-dichlorobenzene, para-dichlorobenzene, meta-dichlorobenzene, trichlorobenzene, or a combination thereof.

The method further comprises one or more of filtering the solution to remove ionic species; washing the solution with aqueous media to remove ionic species; crystallizing bisphenol A dianhydride from the solution to remove ionic species; and contacting the solution with an adsorbent to remove ionic species. In some embodiments, the method comprises one of the foregoing. In some embodiments, the method comprises at least two of the foregoing steps to remove ionic species. In some embodiments, the method comprises at least three of the foregoing steps to remove ionic species. In some embodiments, the method comprises each of the foregoing steps to remove ionic species.

In an embodiment, the method comprises filtering the solution to remove ionic species. The filtering can comprise passing the solution through a filter having a pore size of less than or equal to 2 micrometers, preferably less than 1 micrometer, more preferably 0.2 to 0.45 micrometers.

In an embodiment, the method includes washing the solution with aqueous media. The aqueous media can comprise an aqueous caustic solution. The aqueous caustic solution can be, for example, an aqueous alkali metal bicarbonate solution, for example an aqueous sodium bicarbonate solution. Preferably the aqueous alkali metal bicarbonate solution can have a concentration of 1 to 10 weight percent, based on the total weight of the alkali metal bicarbonate solution.

In an embodiment, the method includes crystallizing the bisphenol A dianhydride from the solution. Crystallizing the bisphenol A dianhydride can optionally include adding an antisolvent to the solution and cooling the solution to a temperature effective to provide a slurry. The antisolvent can be a non-polar solvent. In some embodiments, the antisolvent can comprise heptane, hexane, pentane, benzene, ligroin, or a combination thereof. In a specific embodiment, the antisolvent can comprise heptane. Cooling the solution can be, for example, to a temperature of 20 to 100° C., or 50 to 100° C., or 65 to 85° C.

In an embodiment, the method comprises contacting the solution with the adsorbent. The adsorbent can be, for example, celite, diatomaceous earth, silica, alumina, or a combination thereof. The method can further comprise filtering the solution comprising the adsorbent through a filter having a pore size of 60 micrometers or less, preferably 40 to 60 micrometers.

The method of the present disclosure can provide a purified bisphenol A dianhydride. The purified bisphenol A dianhydride can comprise less than 25 ppm each of sodium ions, potassium ions, calcium ions, zinc ions, aluminum ions, titanium ions, iron ions, and phosphorus ions. For example, the purified bisphenol A dianhydride can comprise 1 to less than 25 ppm each of sodium ions, potassium ions, calcium ions, zinc ions, aluminum ions, titanium ions, iron ions, and phosphorus ions The purified bisphenol A dianhydride can comprise less than 50 ppm each of phosphate ions, sulfate ions, chloride ions, nitrate ions, and nitrite ions. For example, the purified bisphenol A dianhydride can comprise 1 to less than 50 ppm each of phosphate ions, sulfate ions, chloride ions, nitrate ions, and nitrite ions.

A bisphenol A dianhydride made by the method of the present disclosure represents another aspect of the present disclosure. The bisphenol A dianhydride comprises less than 25 ppm, or 1 to less than 25 ppm each of sodium ions, potassium ions, calcium ions, zinc ions, aluminum ions, titanium ions, iron ions, and phosphorus ions; and less than 50 ppm, or 1 to less than 50 ppm each of phosphate ions, sulfate ions, chloride ions, nitrate ions, and nitrite ions.

The bisphenol A dianhydride of the present disclosure can be particularly useful for the preparation of a poly(etherimide). Accordingly, a poly(etherimide) comprising repeating units derived from polymerization of the purified bisphenol A dianhydride composition and an organic diamine. The bisphenol A dianhydride can be purified according to the methods described herein and can therefore advantageously possess low levels of contaminants.

The organic diamine can include 1,4-butane diamine, 1,5-pentanediamine, 1,6-hexanediamine, 1,7-heptanediamine, 1,8-octanediamine, 1,9-nonanediamine, 1,10-decanediamine, 1,12-dodecanediamine, 1,18-octadecanediamine, 3-methylheptamethylenediamine, 4,4-dimethylheptamethylenediamine, 4-methylnonamethylenediamine, 5-methylnonamethylenediamine, 2,5-dimethylhexamethylenediamine, 2,5-dimethylheptamethylenediamine, 2, 2-dimethylpropylenediamine, N-methyl-bis (3-aminopropyl) amine, 3-methoxyhexamethylenediamine, 1,2-bis(3-aminopropoxy) ethane, bis(3-aminopropyl) sulfide, 1,4-cyclohexanediamine, bis-(4-aminocyclohexyl) methane, m-phenylenediamine, p-phenylenediamine, 2,4-diaminotoluene, 2,6-diaminotoluene, m-xylylenediamine, p-xylylenediamine, 2-methyl-4,6-diethyl-1,3-phenylene-diamine, 5-methyl-4,6-diethyl-1,3-phenylene-diamine, benzidine, 3,3'-dimethylbenzidine, 3,3'-dimethoxybenzidine, 1,5-diaminonaphthalene, bis(4-aminophenyl) methane, bis(2-chloro-4-amino-3,5-diethylphenyl) methane, bis(4-aminophenyl) propane, 2,4-bis(p-amino-t-butyl) toluene, bis(p-amino-t-butylphenyl) ether, bis(p-methyl-o-aminophenyl) benzene, bis(p-methyl-o-aminopentyl) benzene, 1, 3-diamino-4-isopropylbenzene, bis(4-aminophenyl) sulfide, bis-(4-aminophenyl) sulfone (also known as 4,4'-diaminodiphenyl sulfone (DDS)), and bis(4-aminophenyl) ether. Any regioisomer of the foregoing compounds can be used. $C_{1-4}$ alkylated or poly($C_{1-4}$)alkylated derivatives of any of the foregoing can be used, for example a polymethylated 1,6-hexanediamine. Combinations of these compounds can also be used. In some embodiments the organic diamine is 4,4'-diaminodiphenylsulfone, 3,4'-diaminodiphenylsulfone, 3,3'-diaminodiphenylsulfone, meta-phenylene diamine, para-phenylene diamine, ortho-phenylene diamine, or a combination thereof.

The purified bisphenol A dianhydride and the organic diamine are contacted under conditions effective to provide the poly(etherimide). The purified bisphenol A dianhydride and the organic diamine can be contacted in the presence of a solvent, for example, a halogenated solvent. In a specific embodiment, the halogenated solvent can comprise ortho-dichlorobenzene. Conditions effective to provide the poly (etherimide) can include a temperature of 170 to 380° C., and a solids content of 1 to 50 weight percent, preferably 20 to 40 weight percent, more preferably 25 to 35 weight percent. Polymerizations can be carried out for 2 to 24 hours, preferably 3 to 16 hours. The polymerization can be conducted at reduced, atmospheric, or high pressure.

The method can also optionally employ various chain stoppers or end capping agents, and thus the poly(etherimide) can optionally further comprise at least one chain end derived from a chain stopper. The chain stopper limits molecular weight growth rate and thus can be used to control molecular weight in the poly(etherimide). Exemplary chain stoppers include certain mono amines (for example aniline), mono anhydrides (for example phthalic anhydride), monophenolic compounds and the like. In some embodiments, the chain stopper can preferably be a monoamine chain stopper or a monoanhydride chain stopper, more preferably aniline or phthalic anhydride. It should be understood however that the poly(etherimide)s disclosed herein can be produced having any desired weight average molecular weight (Mw) with any end cap.

In some embodiments, no catalysts are used in the polymerization of the poly(etherimide).

The method of making the poly(etherimide) can optionally further comprise a devolatilization step. Low levels of residual volatile species in the final polymer product can be achieved by devolatilization, and devolatilization can also serve to finish the end groups in the polymer product. In some embodiments the bulk of any solvent may be removed, and any residual volatile species may be removed from the polymer product by devolatilization, optionally at reduced pressure. In other embodiments the polymerization reaction is taken to some desired level of completion in solvent and then the polymerization is essentially completed during at least one devolatilization step following the initial reaction in solution. Apparatuses to devolatilize the polymer mixture and reduce solvent and other volatile species to the low levels needed for good melt processability are generally capable of high temperature heating under vacuum with the ability to rapidly generate high surface area to facilitate removal of the volatile species. The mixing portions of such apparatuses are generally capable of supplying sufficient power to pump, agitate and stir the high temperature, amorphous poly(etherimide) melt which may be very viscous. Suitable devolatilization apparatuses include, but are not limited to, wiped films evaporators and devolatilizing extruders, especially twin-screw extruders with multiple venting sections. In some embodiments, the method can optionally further comprise devolatilizing the poly(etherimide) at 360 to 390° C. for 1 to 30 minutes.

The poly(etherimide) prepared according to the method described herein and using the bisphenol A dianhydride purified according to the present disclosure can advantageously have low levels of residual impurities. For example the poly(etherimide) comprises less than 25 ppm each of sodium ions, potassium ions, calcium ions, zinc ions, aluminum ions, titanium ions, iron ions, and phosphorus ions, and less than 25 ppm each of phosphate ions, sulfate ions, chloride ions, nitrate ions, and nitrite ions.

Poly(etherimides) prepared according to the method of the present disclosure can be particularly useful for forming various articles. The poly(etherimide) can be formed into articles using a suitable technique, for example, melt-processing techniques. Melt-molding methods can include injection molding, extrusion molding, blow molding, rotational molding, coining, and injection blow molding. For example, the melt molding method can be injection molding. The poly(etherimide) can be formed into sheets or films by casting, blowing, or extruding. These can be further thermoformed into articles and structures that can be oriented from the melt or at a later stage in the processing of the compositions. The poly(etherimide) can be over-molded onto an article made from a different material or by a different process. The articles can also be formed using techniques such as compression molding or ram extruding. The articles can be further formed into other shapes by machining. Exemplary articles include a fiber, a film, a sheet, a foam, a filament, a molded article, an extruded article, or a powder. The poly(etherimide) of the present disclosure can also be particularly suitable for use in optoelectronic applications. In particular, the poly(etherimide) can be used for optoelectronic articles such as transmitters, receivers, connectors, lenses, waveguides, and the like.

Accordingly, an improved method for the purification of a bisphenol A dianhydride having low levels of residual contaminants is provided herein. The bisphenol A dianhydride of the present disclosure can be used for the preparation of a poly(etherimide) having desirable properties, which can be particularly useful for various applications, for example in optical articles.

This disclosure is further illustrated by the following examples, which are non-limiting.

EXAMPLES

Materials used in the following Examples are described in Table 1.

TABLE 1

| Material | Description |
|---|---|
| 3,3'-BPA-TA | 3,3'-bisphenol A diphthalic acid (3,3'-bisphenol A tetraacid) |
| 3,4'-BPA-TA | 3,4'-bisphenol A diphthalic acid (3,4'-bisphenol A tetraacid) |
| 4,4'-BPA-TA | 4,4'-bisphenol A diphthalic acid (4,4'-bisphenol A tetraacid) |

TABLE 1-continued

| Material | Description |
|---|---|
| N,N'-Ph-3,3'-BPA-BI | N,N'-phenyl-3,3'-bisphenol A diphthalimide |
| N,N'-Ph-3,4'-BPA-BI | N,N'-phenyl-3,4'-bisphenol A diphthalimide |
| N,N'-Ph-4,4'-BPA-BI | N,N'-phenyl-4,4'-bisphenol A diphthalimide |
| 3,3'-BPA-TA•4Na | 3,3'-bisphenol A diphthalic acid tetrasodium salt |
| 3,4'-BPA-TA•4Na | 3,4'-bisphenol A diphthalic acid tetrasodium salt |

TABLE 1-continued

| Material | Description |
| --- | --- |
| 4,4'-BPA-TA•4Na | 4,4'-bisphenol A diphthalic acid tetrasodium salt |
| BPA-AnhDA | bisphenol A anhydride diacid |
| 3,3'-BPA-DA | 3,3'-bisphenol A diphthalic anhydride |
| 3,4'-BPA-DA | 3,4'-bisphenol A diphthalic anhydride |

TABLE 1-continued

| Material | Description |
|---|---|
| 4,4'-BPA-DA | 4,4'-bisphenol A diphthalic anhydride |
| PA | Phthalic Anhydride |
| m-PD | Meta-phenylene diamine |
| 4,4'-DDS | Diaminodiphenyl sulfone |
| DI water | Deionized water |
| o-DCB | Ortho-dichlorobenzene |

Polymer molecular weight were determined by gel permeation chromatography (GPC) with respect to polystyrene standards.

All ultra-performance liquid chromatography (UPLC) analyses in the following examples were performed on a Waters ACQUITY UPLC BEH C18 1.7 micrometer 2.1×50 mm column at 35° C. PDA detection was performed at 254 nm with a flow rate of 0.313 mL/min. A gradient method was used with a dual solvent system of acetonitrile and acidic water (4 L DI $H_2O$+3 mL 85% $H_3PO_4$). It is noted that UPLC analysis of BPA-DA shows small amounts of BPA-Anhydride-Diacid ("BPA-AnhDA") due to partial hydrolysis that occurs during analysis.

All residual levels of metals (sodium, potassium, zinc, calcium, aluminum, iron, titanium, phosphorus) in the following examples are determined by an inductively coupled plasma-digestion (ICP-Dig) method which uses an ICP spectrometer equipped with: an axial and/or radial viewing, a Gem Cone and/or Ultrasonic nebulizer, and a microwave digestion system equipped with appropriate sample digestion vessels set. Samples are prepared using concentrated nitric acid, hydrochloric acid, sulfuric acid, and/or hydrofluoric acid Supra pure grades.

Residual levels of anions (sulfates, chlorides, phosphates, nitrates, nitrites) present in BPA-DA and poly(etherimide) samples were measured by extraction-ion chromatography (IC-Extract). The BPA-DA samples were dissolved in methylene chloride and the poly(etherimide) samples were dissolved in methylene chloride with hexafluroroisopropanol (HFIP) added to help with solubility. The solutions were then extracted with deionized water, and then the aqueous extracts were analyzed using a calibrated Dionex ICS 2000 instrument.

Residual levels of anions (sulfates, chlorides, phosphates, nitrates, nitrites) present in BPA-TA samples were measured by total ion chromatography combustion (IC-Total) using a calibrated Dionex ICS 2000 instrument.

DSC measurements of the polymer sample (~5 mg) were performed with a TA Q1000 DSC instrument. The film samples were scanned from 40-350° C. under nitrogen atmosphere. The glass transition temperature (Tg), and the melting temperature (Tm) of the polymers were determined from the second heating scan. Heating rate of 20° C./min was used in these experiments.

Examples 1-4

Examples 1-4 examine the efficiency of various washing methods for removing sodium from 3,3'-BPA-TA. Table 2 summarizes the starting composition of the 3,3'-BPA-TA, the washing conditions, and the final sodium and sulfate content. In each example, the washes were monitored until the sodium level in the filtrate was below 40 ppm. The results of the study show that washing 3,3'-BPA-TA at 25° C. without agitation required 2000 mL of water to reduce the amount of sodium to the target level. Similar washing with vigorous stirring at 25° C. only required 700 mL of water. At 90° C., the amount of water needed was also reduced to 900 mL and 500 mL for non-agitated and agitated washing, respectively. The results are shown in FIG. 1.

Example 5

A mixture of BPA-TA isomers was prepared as described below in Example 14. The BPA-TA wet cakes were isolated via centrifugation and the cakes were washed with DI water several times until the filtrate was found to contain less than 100 ppm of sodium present. The remaining solids had the following profile: ICP-Dig: sodium (25 ppm), potassium (6 ppm), zinc (0 ppm), calcium (5 ppm), aluminum (0 ppm), iron (0 ppm), titanium (0 ppm), phosphorus (10 ppm); IC-Totals: sulfates (57 ppm), chlorides (1,242 ppm), phosphates (<20 ppm), nitrates (304 ppm), nitrites (58 ppm); UPLC: 3,3'-BPA-TA (89.8 mol %), 3,4'-BPA-TA (6.75 mol %).

Prior to the ring-closure reaction, both the vessel and the Mott filter were rinsed and cleaned with DI water and then drained. Next, the vessel was charged with o-DCB (450 kg) followed by 150 kg of BPA-TA wet cakes (127.9 kg dry weight basis, 229.7 mol) containing water. Nitrogen was applied, the mixture (19.9 wt % solids with respect to 3,3'-BPA-DA) was agitated, and then the tempered oil was heated to 200-205° C. to drive off water and ring close. The reactor was then allowed to concentrate to a total mass of 561 kg (21 wt % solids) and maintained at this level by adding fresh o-DCB as needed. After 14 hours, analysis of the overheads showed <30 ppm water present by Karl-Fisher analysis. Meanwhile, a second vessel was cleaned well with o-DCB and drained for future use. Pan solids analysis of the dianhydride solution showed 19.9 wt % solids. UPLC analysis indicated that the reaction was complete. As a result, the solution was cooled to an internal temperature of 160° C. prior to filtration.

The Mott filter was heated to 160° C., and then the reactor contents were sent through the 2 micrometer Mott filter and into the second vessel to remove any residual inorganic species present. A sample of the filtered material showed it to be 19.7 wt % solids by pan solids test. Subsequently, the filtrate was heated to 182-185° C. internal temperature with 50% agitation. Next, the first vessel was rinsed with fresh o-DCB (50 kg) and the rinse was likewise transferred to the second vessel via the Mott filter. Thenceforth, the combined filtrates were concentrated to 415 kg after which it was found to contain 24.6 wt % solids. ICP-Dig: sodium (3 ppm), potassium (7 ppm), zinc (0 ppm), calcium (4 ppm), aluminum (0 ppm), iron (0 ppm), titanium (0 ppm), phosphorus (11 ppm); IC-Extract: sulfates (4.78 ppm), chlorides (0.84 ppm), phosphates (<0.5 ppm), nitrates (<0.5 ppm), nitrites (<0.5 ppm).

At this point, the material was substantially free from contaminant inorganic species and could be used directly in the condensation polymerization to prepare poly(etherimides).

The filtrate was concentrated further to 400 kg (30 wt % solids) and then sent to the first vessel. The solution was agitated at 50% power and then cooled over the weekend by valving out the tempered oil. It was noted that at 64° C. a temperature spike to 68° C. was observed, indicating crystallization had begun. After cooling to 46.5° C. the contents were the visually inspected to confirm crystallization.

The slurry was then transferred to an unheated centrifuge, which contained a Teflon filter media. At 1,000-1,100 rpm, the liquid was separated from the solids in the centrifuge. After 90 minutes, rotation on the centrifuge was ceased and the cake was discharged. This process was repeated until all solids from were collected. A total of four cakes of 3,3'-BPA-DA (127 kg) were collected. A representative pan from each cake was dried in a vacuum oven at 80-85° C. until a consistent mass was obtained of the white solid 3,3'-BPA-DA to estimate the abs. wt % solids of each cake. Based on this information, an estimated dry weight yield of 87.6 kg (73.26% yield from 3,3'-BPA-TA) was obtained for the ring-closure step. ICP-Dig: sodium (2 ppm), potassium (5 ppm), zinc (0 ppm), calcium (0 ppm), aluminum (0 ppm), iron (0 ppm), titanium (0 ppm), phosphorus (12 ppm); IC-Extract: sulfates (10.06 ppm), chlorides (<0.5 ppm), phosphates (<0.5 ppm), nitrates (<0.5 ppm), nitrites (<0.5 ppm).

A vessel was charged with o-DCB (146 kg) and 3,3'-BPA-DA (35.7 kg dry wt basis, 68.6 mol, 0.973 equiv) prepared above. The contents were heated to 105° C. with agitation, then phthalic anhydride (519 g, 3.5 mol, 0.0496 equiv) was added. The contents were held overnight under nitrogen. Next, the vessel was charged with 4,4'-DDS (17.5 kg, 70.5 mol, 1 equiv) and the internal temperature was raised to 130° C. After one hour, the internal temperature was adjusted to 180° C. After an additional two hours, a sample was taken for stoichiometric analysis. Once the batch was 0-0.2 mol % excess dianhydride, the material was sent through a Mott filter (2 micrometer) and into a second vessel while maintaining the solution at 180° C. The solution was concentrated to 35 wt % solids and then held at 170° C. overnight. The polymer solution was then extruded to make pellets. GPC: weight average MW=55,187 g/mol; Mn=24,586 g/mol; PDI=2.24; Mz/Mw=1.47; ICP-Dig: sodium (2.0 ppm), potassium (12 ppm), zinc (2 ppm), calcium (0 ppm), aluminum (0 ppm), iron (0 ppm), titanium (0 ppm), phosphorus (8 ppm); IC-Extract: sulfates (9.7 ppm), chlorides (1.8 ppm), phosphates (1 ppm), nitrates (<0.5 ppm), nitrites (<0.5 ppm); Tg (Differential Scanning calorimetry, DSC): 266° C.

The purification methods for isolated BPA-TA are described in Examples 1-5 and are summarized in Table 2 below. Significantly less water is required to wash the BPA-TA solids when the mixture is agitated, and hot water is used (Example 4), as compared to washing with ambient-temperature water without stirring (Example 1). However, the use of a centrifuge with water washing of the crude BPA-TA provided even better-quality material (Example 5) with lower sulfates and sodium content that that provided by the methods used with a glass-fitted funnel.

TABLE 2

| Ex. No. | Initial | | | Final | |
|---|---|---|---|---|---|
| | Cations (ppm) | Anions (ppm) | Washing Method | Cations (ppm) | Anions (ppm) |
| 1 | 13,600 (Na$^+$) | 15,887 (SO$_4^{2-}$) | no stirring | 91 (Na$^+$) | 584 (SO$_4^{2-}$) |
| | 24 (K$^+$) | <20 (PO$_4^{3-}$) | 25° C. H$_2$O wash until filtrate < | 4.1 (K$^+$) | <20 (PO$_4^{3-}$) |
| | 2 (Ca$^{2+}$) | ND (NO$_3^-$) | 40 ppm | 2.5 (Ca$^{2+}$) | ND (NO$_3^-$) |
| | | ND (NO$_2^-$) | sodium glass-fitted funnel | | ND (NO$_2^-$) |
| 2 | 13,600 (Na$^+$) | 15,887 (SO$_4^{2-}$) | vigorous stirring | 74 (Na$^+$) | 812 (SO$_4^{2-}$) |
| | 24 (K$^+$) | <20 (PO$_4^{3-}$) | 25° C. H$_2$O wash until filtrate < | 4 (K$^+$) | <20 (PO$_4^{3-}$) |
| | 2 (Ca$^{2+}$) | ND (NO$_3^-$) | 40 ppm | 8.3 (Ca$^{2+}$) | 728 (NO$_3^-$) |
| | | ND (NO$_2^-$) | sodium glass-fritted funnel | | 177 (NO$_2^-$) |
| 3 | 13,600 (Na$^+$) | 15,887 (SO$_4^{2-}$) | no stirring | 72 (Na$^+$) | 356 (SO$_4^{2-}$) |
| | 24 (K$^+$) | <20 (PO$_4^{3-}$) | 90° C. H$_2$O wash until filtrate < | 4.4 (K$^+$) | <20 (PO$_4^{3-}$) |
| | 2 (Ca$^{2+}$) | ND (NO$_3^-$) | 40 ppm | 6.2 (Ca$^{2+}$) | 668 (NO$_3^-$) |
| | | ND (NO$_2^-$) | sodium glass-fritted funnel | | 162 (NO$_2^-$) |
| 4 | 13,600 (Na$^+$) | 15,887 (SO$_4^{2-}$) | vigorous stiffing | 51 (Na$^+$) | 416 (SO$_4^{2-}$) |
| | 24 (K$^+$) | <20 (PO$_4^{3-}$) | 90° C. H$_2$O wash until filtrate < | 5.0 (K$^+$) | <20 (PO$_4^{3-}$) |
| | 2 (Ca$^{2+}$) | ND (NO$_3^-$) | 40 ppm | 2.1 (Ca$^{2+}$) | 698 (NO$_3^-$) |
| | | ND (NO$_2^-$) | sodium glass-fritted funnel | | 141 (NO$_2^-$) |
| 5 | — | — | centrifuge | 25 (Na$^+$) | 57 (SO$_4^{2-}$) |
| | | | H$_2$O wash until filtrate <100 ppm sodium | 6.0 (K$^+$) | <20 (PO$_4^{3-}$) |
| | | | | 5.0 (Ca$^{2+}$) | 304 (NO$_3^-$) |
| | | | | | 58 (NO$_2^-$) |

*ND = not determined

Example 6

A hydrolysis vessel was charged with DI water (351 kg). The reactor was agitated at 90% power with a nitrogen purge. A solution of 50% aqueous NaOH (60.25 kg, 753.1 mol, 5.76 equiv) was then added. Next, a solution of N,N'-Ph-BPA-BI (mixture of 94 mol % N,N'-Ph-3,3'-BPA-BI and 4.4 mol % N,N'-3,4'-BPA-BI isomers) in o-DCB (340.25 kg total mass at 25.78 wt % solids) was added over 2.5 hrs. The contents (744 kg) were then sealed with the nitrogen regulator set to 10 psig and heated until the internal pressure reached 130 psig (178° C.). The pressure was maintained at 130 psig for an additional two hours, after which the contents were cooled to 120° C. and agitated overnight. The following morning, the contents were reheated to 180° C. under pressure with 100% agitation. After eight more hours, the contents were cooled to 90° C. and then agitated over the weekend at 90% power. The vessel was carefully depressurized to 2 psig after which a sample was taken. UPLC analyses indicated hydrolysis was complete.

Thenceforth, agitation was halted, and the layers were allowed to separate for two hours. The bottom (o-DCB/aniline) layer was drained and discarded to waste until 469.5 kg remained (474 kg predicted) in the hydrolysis vessel. It was noted that a clean separation occurred. At this point the top (H2O/BPA-TA4.Na) layer (474 kg, 20 wt % solids) remained. The tempered oil of the vessel was then heated to 120-125° C. with 50% agitation. A hold tank was charged with DI water, which was then heated to 95° C. and sent to the hydrolysis vessel as needed to maintain 474 kg weight as the azeotrope distilled out. The overheads were monitored every 30 minutes for the presence of aniline. After UPLC analysis of the vessel bottoms showed no aniline present, 1 kg of material was removed for further studies. Next, the aqueous solution was transferred from the hydrolysis vessel to a second vessel, and its contents were cooled to 67.5° C.

A quench vessel was charged with DI water (40 kg), agitated without heat, and then charged with 69.6% aqueous $HNO_3$ (81.82 kg, 903.8 mol, 6.91 equiv) via a Teflon-lined drum pump with a PVC flexible hose. The transfer lines were subsequently flushed with DI water (15 kg) and sent into the quench vessel with 50% agitation. The aqueous solution of BPA-TA.4Na (501 kg) was then transferred into the quench vessel over 50 minutes, followed by a rinse with DI water (35 kg) to give a total mass of 648 kg. It was observed that the temperature rose from 67.5° C. to 70° C. during the transfer. Agitation of the milky yellow-orange mixture was then gradually increased to 100% power without heat. After a total quench time of 4.5 hours, a sample was found to be a non-tacky free-flowing yellow-orange slurry.

A Teflon-lined flexible hose and fittings with the appropriate compatible material of construction were used to transfer the slurry in the quench vessel to an unheated 40-liter Nutsche filter, containing a 60 micrometer Teflon filter media. Under 50 psig, the liquid was separated from the solids in the Nutsche filter and the filtrate was sent into a polypropylene tote. After the filtration was completed, the transfer process was repeated until the product cake filled the bottom section of the Nutsche filter. The filter was then depressurized.

A hold tank was cleaned and filled with DI water without heating and then pressurized to 50 psig. Water was transferred from the hold tank to the Nutsche filter to wash the product cake. As before, the system was pressurized, and the filtrate was sent into a polypropylene tote. The washing process with DI water was repeated twice more, until the filtrate pH was above 3. The combined aqueous waste was neutralized immediately to a pH of 6-9. This isolation process was repeated multiple times until all material from the quench vessel was collected. A total of 84.5 kg wet cake of BPA-TA isomers was collected to provide a nearly quantitative yield for hydrolysis/quench. Some material (3.22 kg) was removed for further research. ICP-Dig: sodium (109 ppm), potassium (6 ppm), zinc (0 ppm), calcium (1 ppm), aluminum (0 ppm), iron (0 ppm), titanium (0 ppm), phosphorus (10 ppm); IC-Total: sulfates (<20 ppm), chlorides (3,913 ppm), phosphates (<20 ppm), nitrates (3,000 ppm), nitrites (497 ppm); UPLC: BPA-TA isomers (97.52 mol %).

Prior to the ring-closure reaction, the reactor and the Mott filter were rinsed and cleaned with DI water and then drained. Next, the reactor was charged with both o-DCB (400 kg) and the combined BPA-TA wet cakes (72.78 kg dry weight basis, 130.8 mol). Nitrogen was applied, the mixture (14.5 wt % solids with respect to BPA-DA) was agitated, and then heated to 182-187° C. to drive off water and ring close. After 2.5 hrs, the vessel reached the target temperature. The mixture was then allowed to concentrate to a total mass of 352 kg (19.3 wt % solids) and maintained at this level by adding fresh o-DCB as needed. Meanwhile, a second vessel was cleaned well with o-DCB and drained for future use. After 5.5 hours at 182° C., analysis showed the ring-closure was not complete. At this point, the reactor was blocked in at 185° C. for overnight agitation. The following morning, the solution was diluted to 570 kg with fresh o-DCB to make 11.9 wt % solids. After seven more hours, a sample of the overheads showed 39.1 ppm water present. UPLC analysis of the reactor contents indicated the ring-closure was complete. Pan solids test showed 10.65 wt % solids, to provide an estimated yield of 89.2% (10.65%×570 kg/68.07 kg scale) of BPA-DA isomers from BPA-TA isomers. Afterwards the mixture was allowed to cool to 120° C. overnight. UPLC: BPA-DA isomers (95.58 mol %), BPA-AnhDA (2.44 mol %).

The dianhydride solution was sent through a heated 2 micrometer Mott filter and into the second vessel to remove any residual inorganic species present, followed by a rinse with fresh o-DCB (50 kg). The filtrate was then maintained at 182-185° C. with 50% agitation. The filtrate was subsequently concentrated to 352 kg (17-19 wt % solids). Pan solids test showed 15.36 wt %, to provide an estimated yield of 79.4% (15.36%×352 kg/68.07 kg scale) from BPA-TA isomers. ICP-Dig: sodium (0.6 ppm), potassium (1 ppm), iron (2.3 ppm); IC-Extract: sulfates (<0.5 ppm), chlorides (1.57 ppm), phosphates (<0.5 ppm), nitrates (<0.5 ppm), nitrites (<0.5 ppm).

The solution was cooled to 50-55° C. with 50% agitation and then held for two hours. Agitation of the mixture was increased to 85% and then cooled further to 30-40° C. overnight. Agitation was reduced to 40% and the contents were later cooled further to 17° C. After a few hours, the slurry was sent to the Nutsche filter to collect the dianhydride products. A Teflon-lined flexible hose and fittings with the appropriate compatible material of construction were used to transfer the slurry to an unheated 40-liter Nutsche filter, containing a 60 micrometer Teflon filter media. Under 50 psig, the liquid was separated from the solids in the Nutsche filter and the filtrate was sent into a carbon steel drum. After the filtration was completed, the transfer process was repeated until the product cake filled the bottom section of the Nutsche filter. The filter was then depressurized. The filtrate was a dark orange solution that was 1.99 abs wt % solids based on pan solids test. UPLC of the filtrate also showed the presence of both BPA-DA isomers and several unknowns. A total of five cakes were collected, to provide the BPA-DA isomers in a yield of 46.57 kg (68.4% yield from BPA-TA isomers) as a yellow solid. UPLC: BPA-DA isomers (96.89 mol %), BPA-AnhDA (2.95 mol %); ICP-Dig: sodium (2 ppm), potassium (5 ppm), zinc (0 ppm), calcium (0 ppm), aluminum (0 ppm), iron (0 ppm), titanium (0 ppm), phosphorus (12 ppm); IC-Extract: sulfates (0.56 ppm), chlorides (<0.5 ppm), phosphates (<0.5 ppm), nitrates (<0.5 ppm), nitrites (<0.5 ppm).

Example 7

The following example used 3,3'-BPA-TA which had the following profile: ICP-Dig: sodium (269 ppm), potassium (5.6 ppm), zinc (3.1 ppm), calcium (5.4 ppm), aluminum (0 ppm), iron (0 ppm), titanium (0 ppm), phosphorus (5.5 ppm); IC-Total: sulfates (1,082 ppm), chlorides (4,017 ppm), phosphates (<20 ppm).

A 250 mL 3-neck round bottom flask with mechanical stirrer, Dean-Starke trap, condenser, and nitrogen inlet was charged with 3,3'-BPA-TA (26.91 g, 48.36 mmol) and o-DCB (142.6 g). The reaction flask was then placed in an oil bath at 25° C., and the nitrogen flow was increased with agitation at 200 rpm. The set temperature was then adjusted to 200° C. to concentrate the reaction.

After one hour and five minutes, 46.8 g of distillate was removed to make ~20 wt % solids mixture. After an additional 20 minutes, the reaction became a homogenous yellow solution. After an additional 50 minutes, the solution was allowed to cool to ambient temperature overnight without stirring. The following morning, the mixture was reheated to 90° C. with agitation and the solution was found to weigh 113.72 g (22.20 wt % solids). This solution was used in the purification method below and in examples 13 and 19.

A portion of the 3,3'-BPA-DA solution above (15.79 g, 22.20 wt % solids, 3.505 g dry weight) was heated to 90° C. and placed in a glass syringe affixed with a 0.45-micron PTFE filter. After filtration, the syringe was rinsed with ambient-temperature o-DCB (5 mL) and the combined filtrates were concentrated to give 3.39 g (96.7% yield) of a yellow solid. ICP-Dig: sodium (4.4 ppm), potassium (6.8 ppm), zinc (2.7 ppm), calcium (14.8 ppm), aluminum (4.2 ppm), iron (7.7 ppm), titanium (1.3 ppm), phosphorus (5.1 ppm); IC-Extract: sulfates (18 ppm), chlorides (7.8 ppm), phosphates (<0.5 ppm), nitrates (<0.5 ppm), nitrites (<0.5 ppm).

Conversion of similarly washed BPA-TA samples to highly pure BPA-DA was accomplished after ring-closure and filtration of the dianhydride solution through a 0.45-2 micrometer filter, as summarized in Table 3. Examples 5 and 6 show that use of a 2 micrometer Mott filter is sufficient to obtain a highly pure BPA-DA. For small scale procedures, a 0.45 micrometer filter (Example 7) was also highly effective.

TABLE 3

| Ex. No. | BPA-TA | | | BPA-DA | |
|---|---|---|---|---|---|
| | Sodium (ppm) | Anions (ppm) | Purification Method | Sodium (ppm) | Anions (ppm) |
| 5 | 25 | 57 (sulfate) | Mott filtration (2 micron) | 3 | 4.78 (sulfate) |
| 6 | 109 | 3,000 (nitrate) 497 (nitrite) 3,013 (chloride) | 1. Distillation 2. Mott filtration (2 micron) | 0.6 | <0.5 (nitrate) <0.5 (nitrite) 1.57 (chloride) |
| 7 | 269 | 1,082 (sulfate) 4,017 (chloride) | 0.45 micrometer PTFE filter | 4.4 | 18 (sulfate) 7.8 (chloride) |

Comparative Example 8

A Parr reactor was charged with aq. sodium hydroxide (42.17 g, 50 mass %, 527.2 mmol, 5.5 equiv), water (212 g, 212 mL), and N,N'-Ph-3,3'-BPA-BI (204.95 g, 31.367 mass %, 95.85 mmol, 1 equiv) in o-DCB. The reactor was sealed, degassed 10 times with nitrogen, and then heated to 180° C. (135 psig). After 45 minutes, the internal pressure reached 123 psig (180° C.). The temperature was increased to 183° C., whereupon the internal pressure reached 142 psig. The temperature was finally adjusted to 182° C. and after three hours the reactor was cooled to 80° C. After carefully depressurizing the Parr reactor, UPLC analysis of the mixture showed all starting material was consumed.

Next, the mixture was poured into a separatory funnel and the layers separated within two minutes. The colorless organic layer was removed and discarded from the yellow-orange aqueous layer containing 3,3'-BPA-TA.4Na. The aqueous layer was washed with fresh o-DCB (7×200 mL) to remove aniline. After each wash, the layers separated within two minutes. After the sixth wash, only trace aniline was present. After the seventh wash, no aniline was detected.

The aqueous solution remained homogenous after sitting at 25° C. overnight. The solution was filtered through a medium fritted glass funnel to remove a very small black rag layer to obtain 350 mL of filtrate. The filtrate was used directly in a one-pot quench/ring-closure process described below.

A 500 mL 3-neck round-bottom flask with mechanical stirrer, Dean-Stark trap, condenser, and addition funnel was charged with nitric acid (57.3 g, 69.6 mass %, 632.7 mmol) and water (50 g), then heated to 90° C. The room-temperature solution prepared above was placed in the addition funnel (350 mL of solution) and was then added dropwise to the aq. nitric acid over one hour. Additional water (30 mL) was used to rinse the addition funnel and added to the quench vessel. Next, the mixture was heated in an oil bath at 130° C. with a positive nitrogen flow to drive off water and HNO$_3$. After 5.5 hours, the distillate of H$_2$O/HNO$_3$ (368 g) was drained from the Dean-Stark trap. A pH of 1 was measured for the distillate.

Next, o-DCB (250 mL, 325 g) was charged to the flask and the temperature was increased to 145° C. to drive off residual water. After 75 minutes, the temperature was increased to 160° C. and additional o-DCB (50 mL, 65 g) was added. After another 75 minutes, the distillate (156.6 g=65 g $H_2O/HNO_3$+91.6 g o-DCB) was drained from the trap. At this point, it was observed that the mixture contained a yellow-orange solution with a precipitate ($NaNO_3$).

After a total of three hours at 160° C., the distillate of o-DCB (85 g) was drained. UPLC analysis showed the ring-closure reaction was complete. The mixture was a mostly-homogenous dark orange solution with a small amount of solids. The solution was further concentrated over 1 h, 45 min, and additional o-DCB (58 g) was drained from the trap. The solution at this point appeared dark orange-brown, however UPLC analysis did not show a significant change in product purity.

The concentration was adjusted to 20 relative wt % solids [BPA-DA/(BPA-DA+o-DCB)] by adding o-DCB (44 g). After cooling to 120° C., the mixture was filtered through a fine fitted (4-5.5 micrometer) glass funnel. The solids were rinsed with 120° C. o-DCB (50 mL, 65 g). Next, the yellow solids were agitated with o-DCB (50 mL, 65 g) at 120° C. and refiltered. The combined dark amber filtrates (311.28 g) were measured by pan solids test to be 14.44 wt % solids. The calculated dry-weight yield was 44.95 g (>90.10% yield over 3 steps from bisimide). UPLC: BPA-DA isomers+BPA-AnhDA (98.63%); ICP-Dig: sodium (111), potassium (12 ppm), zinc (9.4 ppm), calcium (8 ppm), aluminum (2 ppm), iron (5.1 ppm), titanium (0 ppm), phosphorus (13.2 ppm); IC-Extract: sulfates (<0.5 ppm), chlorides (<0.5 ppm), phosphates (<0.5 ppm), nitrates (<0.5 ppm), nitrites (<0.5 ppm).

Example 9

A Parr reactor was charged with pure N,N'-Ph-3,3'-BPA-BI (30 g, 44.73 mmol, 1 equiv), 50% aq. NaOH (19.68 g, 50 mass %, 246.0 mmol, 5.5 equiv) and water (98.6 g, 98.6 mL). The mixture was stirred briefly with a glass rod to make a slurry, sealed, degassed 10 times with nitrogen, and then heated to 180° C. (135 psig). After one hour the internal pressure reached 135 psig (180° C.). After three hours at temperature, the reaction was cooled to 70° C. UPLC analysis of the homogenous light-yellow solution showed that the reaction was complete. The crude reaction was then transferred to a separatory funnel, rinsing with water at 25° C. The mixture was washed with ethyl acetate (EtOAc) multiple times at 25° C. until all aniline was removed. It was observed that the color of both the aqueous layer and organic layers varied significantly throughout the washing procedure.

The washing study showed that all aniline was removed with a total of 250 mL (4 washes) of EtOAc on this scale (28.82 g of 3,3'-BPA-TA.4Na). The final aqueous 3,3'-BPA-TA4TA solution was violet in color. UPLC analysis showed it contained 98.98% BPA-TA isomers.

In a separate 500 mL 3-neck, roundbottom flask with mechanical stirrer, Dean-Stark trap, condenser, addition funnel, and nitrogen inlet, was placed hydrochloric acid (28.8 g, 37.4 mass %, 295.2 mmol, 6.6 equiv) and water (17 g). The solution was then heated to 90° C. The homogenous violet colored aqueous solution of 3,3'-BPA-TA.4Na (210 mL, 44.73 mmol) was placed into the addition funnel at 25° C. and added drop-wise to the acid quench solution. After 50 minutes the addition was complete. The mixture was a filterable slurry containing a faint lavender solid which was not isolated. The aqueous slurry of 3,3'-BPA-TA was taken directly onto the ring-closure reaction.

The crude aqueous slurry of 3,3'-BPA-TA (44.73 mmol), containing HCl and NaCl, was next heated in an oil bath set to 120° C. to concentrate the mixture. Copious amounts of water was distilled off measuring a pH of 1. After 3.25 hours, the mixture was cooled to 25° C. The oil bath was heated to 185° C. to concentrate further. After a total distillate mass of 220.88 g (pH=1) was drained from the Dean-Stark trap, o-DCB (300 mL) was added to the reaction flask and heating was continued. After removing more distillate (134 mL), only o-DCB was coming overhead and the solvent-swap process was complete. Additional o-DCB (177 mL) was added to make a homogenous tan solution.

The contents were heated at reflux for an additional five hours. UPLC analysis showed that the ring-closure was complete to make 3,3'-BPA-DA. Next, the solution was cooled to 110° C., and then hot filtered through a Whatman #1 filter paper to remove the bulk of NaCl. The filtrate was refiltered at 110° C. through a fine fritted (4-5.5 micrometer) glass funnel. The off-white solids were combined and washed with 25° C. o-DCB. The combined filtrates (250 mL, 318.71 g) appeared yellow-tan in color. Pan solids test determined the 3,3'-BPA-DA/o-DCB solution was 6.96 wt % solids. The calculated dry-weight yield was therefore 22.18 g (95.3%) over three steps from N,N'-Ph-3,3'-BPA-BI. UPLC: BPA-DA isomers+BPA-AnhDA (99.66%); ICP-Dig: sodium (0), potassium (12 ppm), zinc (13 ppm), calcium (10 ppm), aluminum (1 ppm), iron (9.5 ppm), titanium (0 ppm), phosphorus (22 ppm); IC-Extract: sulfates (<0.5 ppm), chlorides (2.47 ppm), phosphates (<0.5 ppm), nitrates (0.87 ppm), nitrites (<0.5 ppm).

The purification methods of Examples 8 and 9 are summarized in Table 4 below. The BPA-TA.4Na intermediates were quenched with either nitric acid (Example 8) or hydrochloric acid (Example 9) to provide BPA-TA. The tetraacid products were not isolated, but were directly ring-closed in o-DCB to form BPA-DA. Excess nitric acid and hydrochloric acid were distilled off in the process. It was observed that filtration through a fine-fitted glass funnel alone (Example 8) was not as effective at removing sodium as filtration through a Mott filter (Examples 5 and 6) or than filtration through filter paper with a fine-fitted glass funnel (Example 9).

TABLE 4

| Ex. No. | BPA-TA preparation | BPA-DA Purification Method | Sodium (ppm) | Anions (ppm) |
|---|---|---|---|---|
| 8* | Quenched from $HNO_3$-not isolated | 1. Distillation<br>2. Filtered through fine-fitted (4-5.5 micrometer) glass funnel | 111 | <0.5 (nitrates) |
| 9 | Quenched from HCl-not isolated | 1. Distillation<br>2. Filtered through filter paper and fine-fitted (4-5.5 micrometer) glass funnel | 0 | 2.47 (chlorides) |

*Denotes comparative example

Example 10a

A culture tube was charged with 3,3'-BPA-DA (2.6 g, 5.0 mmol) and o-DCB (8 mL) to make a 20 wt % solids mixture then heated in an oil bath at 85° C. until a homogenous solution formed. In a volumetric flask, a stock solution was prepared of $H_2SO_4$ (95%, 103 mg, 1.03 mmol) in DI water to make a 50 mL solution. In a second volumetric flask, a stock solution was prepared of $NaHCO_3$ (42 mg, 0.50 mmol) in DI water to make a 25 mL solution. To the culture tube containing the BPA-DA/o-DCB solution was added 2.5 mL of the aq. $NaHCO_3$ stock solution (4.2 mg dry wt, 0.05 mmol, 1 mol %) and 2.5 mL of the aq. $H_2SO_4$ stock solution (4.90 mg dry wt, 0.05 mmol, 1 mol %). The mixtures were heated at 85° C. with vigorous stirring and samples were taken every hour to monitor the formation of BPA-TA (ring-opened product). After six hours, UPLC analysis indicated the following species present: BPA-DA (36.6%), BPA-TA (47.5%), and BPA-Anhydridediacid.

Example 10b

A culture tube was charged with 3,3'-BPA-DA (2.6 g, 5.0 mmol) and o-DCB (8 mL) to make a 20 wt % solids mixture then heated in an oil bath at 85° C. until a homogenous solution formed. In a volumetric flask, a stock solution was prepared of $H_2SO_4$ (95%, 103 mg, 1.03 mmol) in DI water to make a 50 mL solution. In a second volumetric flask, a stock solution was prepared of $NaHCO_3$ (462 mg, 5.5 mmol) in DI water to make a 25 mL solution. To the culture tube containing the BPA-DA/o-DCB solution was added 2.5 mL of the aq. $NaHCO_3$ stock solution (46.2 mg dry wt, 0.55 mmol, 11 mol %) and 2.5 mL of the aq. $H_2SO_4$ stock solution (4.90 mg dry wt, 0.05 mmol, 1 mol %). The mixtures were heated at 85° C. with vigorous stirring and samples were taken every hour to monitor the formation of BPA-TA (ring-opened product). After six hours, UPLC analysis indicated the following species present: BPA-DA (79.6%), BPA-TA (5.3%), and BPA-Anhydridediacid.

Example 10c

A culture tube was charged with 3,3'-BPA-DA (2.6 g, 5.0 mmol) and o-DCB (8 mL) to make a 20 wt % solids mixture then heated in an oil bath at 85° C. until a homogenous solution formed. In a volumetric flask, a stock solution was prepared of $H_2SO_4$ (95%, 103 mg, 1.03 mmol) in DI water to make a 50 mL solution. In a second volumetric flask, a stock solution was prepared of $NaHCO_3$ (1.385 g, 16.5 mmol) in DI water to make a 25 mL solution. To the culture tube containing the BPA-DA/o-DCB solution was added 2.5 mL of the aq. $NaHCO_3$ stock solution (138.5 mg dry wt, 1.65 mmol, 33 mol %) and 2.5 mL of the aq. $H_2SO_4$ stock solution (4.90 mg dry wt, 0.05 mmol, 1 mol %). The mixtures were heated at 85° C. with vigorous stirring and samples were taken every hour to monitor the formation of BPA-TA (ring-opened product). After six hours, UPLC analysis indicated the following species present: BPA-DA (97.9%), BPA-TA (0%).

Figure 2:
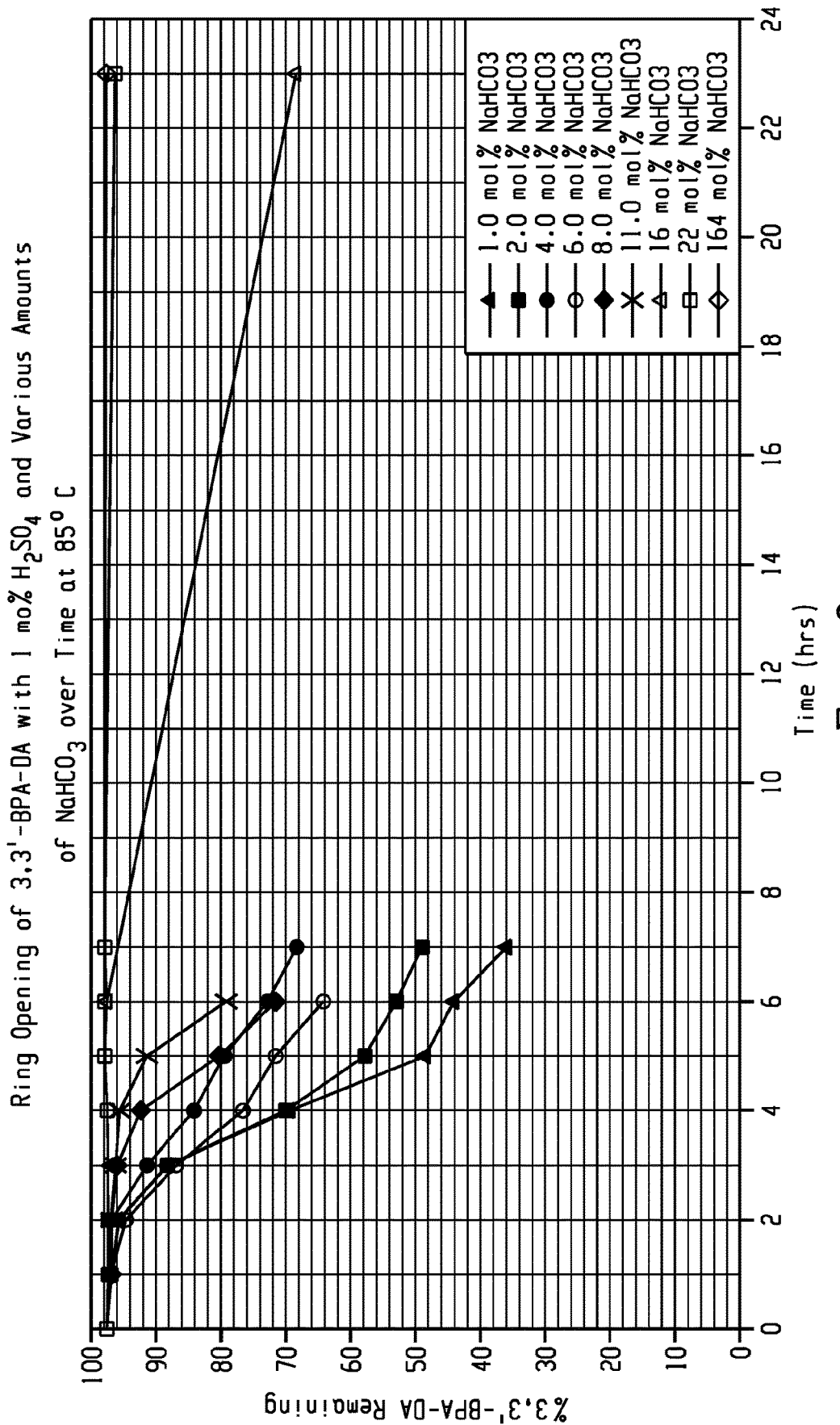
FIG. 2 shows the effect of $NaHCO_3$ concentration on ring-opening of bisphenol A dianhydride.
Figure 3:
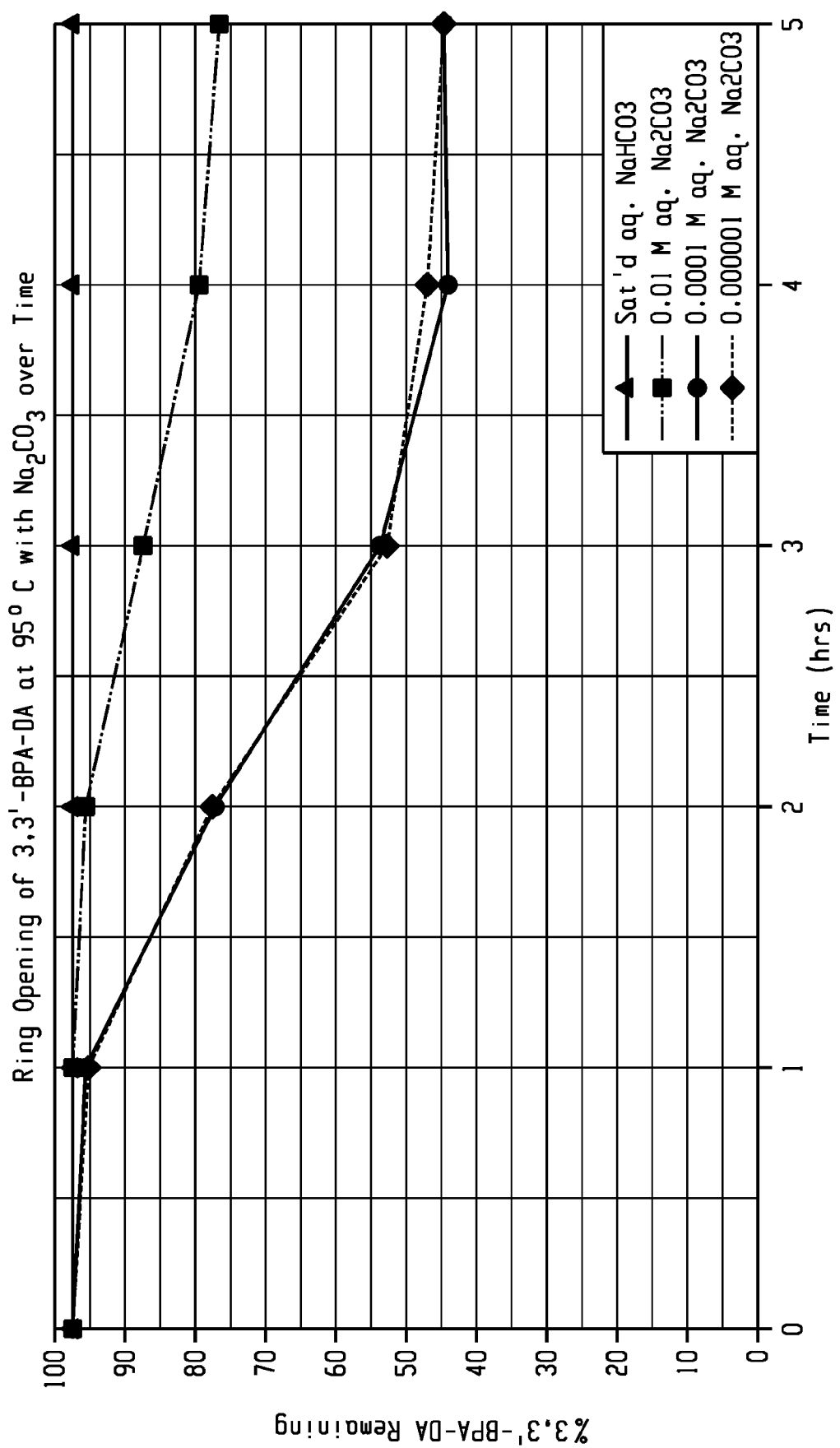
FIG. 3 shows the effect of $Na_2CO_3$ concentration on ring-opening of bisphenol A dianhydride.
Figure 4:
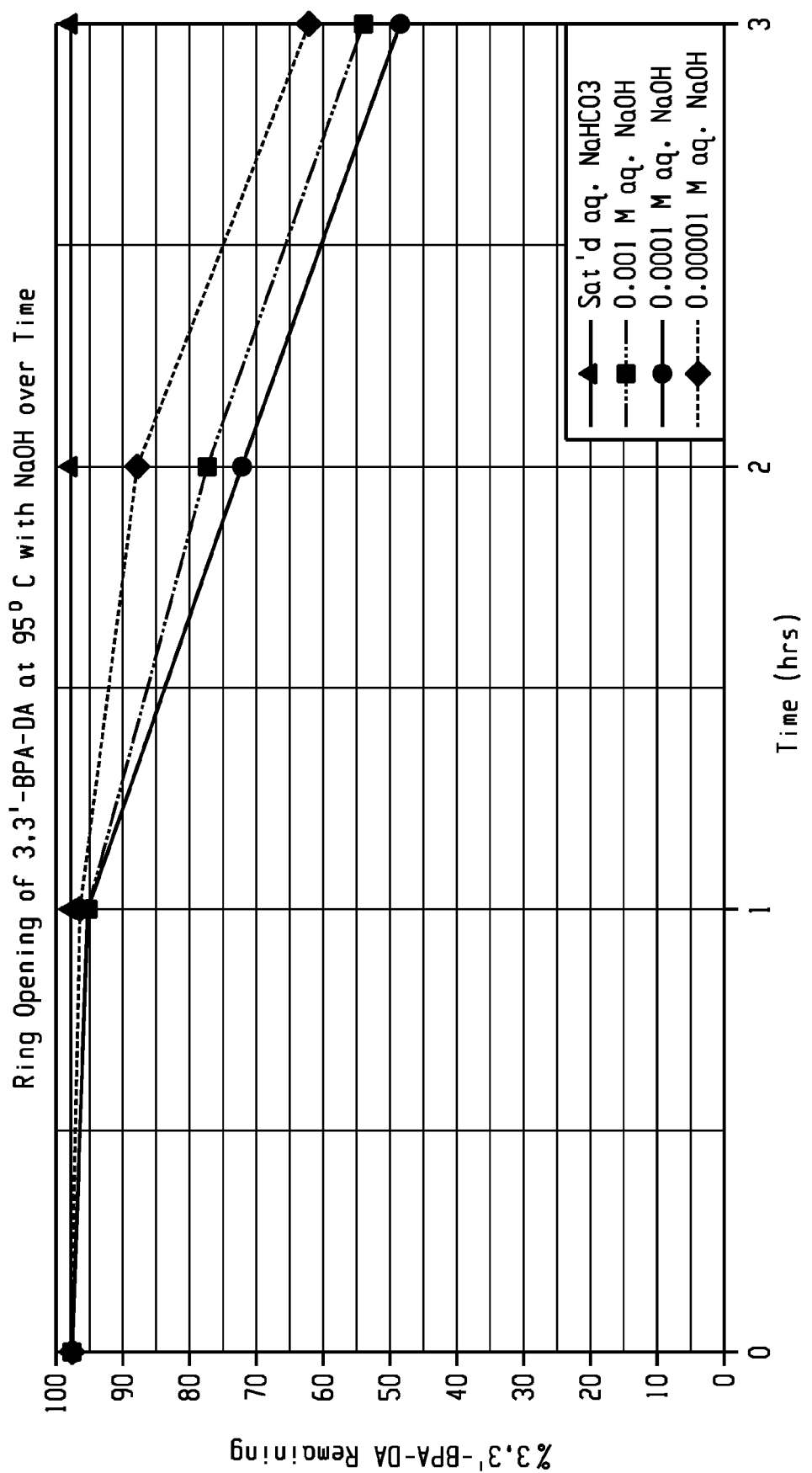
FIG. 4 shows the effect of NaOH concentration on ring-opening of bisphenol A dianhydride

The effect of $NaHCO_3$ concentration on ring-opening of BPA-DA examined in Examples 10a-c is further illustrated in FIG. 2, where it can be seen that treatment of the 3,3'-BPA-DA solution (containing 1 mol % $H_2SO_4$) with only 1 mol % (0.01 equiv) of $NaHCO_3$ in water resulted in significant amounts of ring-opened product after only one hour. Washing with greater than 8 mol % (0.08 equiv) of $NaHCO_3$ in water allowed for washing times of up to three hours without significant impact on product quality. Finally, washing the 3,3'-BPA-DA solution with greater than 22 mol % (0.22 equiv) of $NaHCO_3$ in water showed little to no signs of ring-opening after 23 hours of mixing time. The 3,3'-BPA-DA solutions were stable for up to two hours in contact with DI water without evidence of ring-opening. However, when contact times exceeded four hours, then significant amounts of BPA-DA degradation to BPA-AnhDA and BPA-TA was observed. FIGS. 3 and 4 show that the use of a stronger base such as $Na_2CO_3$ or NaOH does not work, as significant amounts of ring-opening was observed. Thus the present inventors have unexpectedly found that a specific set of washing conditions are needed to avoid decomposition of the desired product.

Example 11

The following procedure used 3,3'-BPA-TA which had the following profile: ICP-Dig: sodium (72 ppm), potassium (4.4 ppm), zinc (0.5 ppm), calcium (4.8 ppm), aluminum (9.3 ppm), iron (3.8 ppm), titanium (0 ppm), phosphorus (7.4 ppm); IC-Total: sulfates (542 ppm), chlorides (406 ppm), phosphates (<20 ppm), nitrates (<20 ppm), nitrites (<20 ppm).

In a 250 mL 2-neck round-bottom flask with magnetic stir bar, Dean-Stark trap and condenser was placed ground 3,3'-BPA-TA (10 g, 17.97 mmol, 1 equiv), aq. sulfuric acid (0.1762 g, 0.08985 mmol, 0.5 mol %, 0.005 equiv, 881 ppm w.r.t. 3,3'-BPA-TA), and o-DCB (100 g, 76.9 mL). The flask was then placed in an oil bath at 185° C. under nitrogen. After 40 minutes the distillate (25 mL) was drained from the Dean-Stark trap and fresh o-DCB (25 mL) was added to the reaction flask. After a cycle time of two hours, a homogenous yellow-green solution was observed. UPLC analysis indicated that the reaction was 99.82% complete. The mixture was removed from heat and the remaining distillate (31 mL) was drained from the trap. Pan solids test revealed the reaction mixture was 9.95 wt % solids (93.97 g total mass present).

The reaction mixture (88.01 g, 9.95 wt % solids) was reheated in a 1 L beaker to 85° C. to make a homogenous olive-green to orange solution. A saturated aqueous solution of sodium bicarbonate (8.25 wt %, 9 g $NaHCO_3$/100 g water) was heated to 85° C. in a separate beaker. The reaction solution was charged with the aq. $NaHCO_3$ solution (60 mL) and stirred well for 30 seconds. After agitation was discontinued, the layers separated within one minute. The top aqueous layer darkened to an orange-yellow color (still pH=9) while the bottom organic layer became a lighter yellow solution. Agitation at 85° C. was continued for three hours to track the degradation of product. A sample of the aqueous layer showed trace BPA-TA isomers and a trace unknown at 2.978 minutes. A sample of the organic layer showed pure BPA-DA isomers and BPA-Anhydridediacid.

The layers were separated, and the organic layer was washed with water (3×60 g) at 85° C. for three minutes each. The layers separated within seconds after discontinuing agitation. After a first water wash, the sodium content was reduced from 10,000 ppm to 30 ppm. Subsequent washes reduced the sodium content further to 8 ppm and 4 ppm. The final organic layer was concentrated further in a beaker with a hot plate to drive off water. The solution of 3,3'-BPA-DA in o-DCB weighed 57.75 g with a concentration of 11.99 wt % solids (pan solids test). The yield was calculated to be 79.07%, based on the 88.01 g solution used for washing studies. UPLC: BPA-DA isomers+3,3'-BPA-AnhDA (98.81%); ICP-Dig: sodium (1.6 ppm), potassium (5.8 ppm), zinc (1.8 ppm), calcium (10 ppm), aluminum (0 ppm), iron (2.3 ppm), titanium (0 ppm), phosphorus (15 ppm); IC-Extract: sulfates (2.4 ppm), chlorides (<0.5 ppm), phosphates (<0.5 ppm), nitrates (<0.5 ppm), nitrites (<0.5 ppm).

Example 12

The following procedure used 3,3'-BPA-TA which had the following profile: ICP-Dig: sodium (274 ppm), potassium (2.7 ppm), zinc (1.5 ppm), calcium (3.2 ppm), aluminum (0 ppm), iron (7.7 ppm), titanium (0 ppm), phosphorus (8.3 ppm); IC-Total: sulfates (1,208 ppm), chlorides (671 ppm), phosphates (<20 ppm), nitrates (530 ppm), nitrites (128 ppm).

A 2 L 3-neck round-bottom flask with mechanical stirrer and Dean-Stark trap/condenser under nitrogen was charged with a coarsely-ground wet cake of 3,3'-BPA-TA (200 g, 281 mmol, 78.30 wt %) and o-DCB (1044 g, 803 mL), then placed in an oil bath and heated to 182° C. After 3 h, 15 min the Dean-Stark trap was drained (369.23 g=43 g $H_2O$+ 326.23 g o-DCB). Additional o-DCB (100 g) was then added to the reaction and heating was continued. Two hours later, more distillate (141.56 g=1 g $H_2O$+140.56 g o-DCB) was drained from the trap and additional o-DCB (100 g) was added to the homogenous light-yellow reaction solution. UPLC analysis showed the ring-closure was complete and all tetraacid was consumed. It was estimated that the solution contained 15.7 wt % solids at a total mass of 933 g.

The contents were concentrated further, draining more distillate (203.81 g), to make a 20 wt % solids solution. The reaction was then allowed to cool to 25° C. The total mass of 695 g was obtained, and pan solids showed it to be 21.27 wt % solids. The solution was reheated to 85° C. and washed with 2.2 wt % aq. $NaHCO_3$ (350 g, preheated to 85° C.) for 10-15 mins. The layers separated within two minutes after discontinuing agitation. The aqueous layer was orange-red in color and the organic layer appeared to have a lighter orange color than before. The organic layer was next washed with $H_2O$ (350 g) at 85° C. for two minutes. Again, the layers separated within two minutes after discontinuing agitation. The organic layer was washed three more times with water (100 g each). After one water wash, the sodium content was reduced from 4,000 to 200 ppm. Subsequent washes further reduced the sodium content to 60, 20 and 10 ppm. After the washings, the orange organic solution (660.39 g) was placed back into a 4-neck 2 L round-bottom flask with a mechanical stirrer, Dean-Stark trap, condenser, and nitrogen. The dianhydride solution was reheated to reflux to drive off residual water. After all water was distilled off, a similar quantity of o-DCB was added back to the vessel. Pan solids showed the light orange solution (658.5 g) of 3,3'-BPA-DA was 22.17 wt % solids. The calculated yield was 99.7% (145.99 g dry weight). UPLC: BPA-DA isomers+ BPA-AnhDA (97.4%). ICP-Dig: sodium (1.7 ppm, potassium (6.8 ppm), zinc (10.3 ppm), calcium (14.5 ppm), aluminum (0 ppm), iron (1.1 ppm), titanium (0 ppm), phosphorus (16 ppm); IC-Extract: sulfates (0.56 ppm), chlorides (<0.5 ppm), phosphates (<0.5 ppm), nitrates (<0.5 ppm), nitrites (<0.5 ppm).

Comparative Example 13

The following example used the 3,3'-BPA-DA solution prepared in Example 7.

A portion of the 3,3'-BPA-DA solution (41.08 g, 22.20 wt % solids, 9.120 g dry weight) was heated to 90° C. and placed in a 100 mL separatory funnel with 90° C. saturated aqueous sodium bicarbonate solution (30 mL). The contents were shaken for one minute then the layers were allowed to separate for two minutes. The aqueous layer was removed and was measured to have a pH of 10. The organic layer was reheated to 90° C., placed back into the separatory funnel, and washed with 90° C. deionized water (2×30 mL) for one minute. The layers were allowed to separate over two minutes before separating. The organic layer was concentrated to give 8.50 g (93.2% yield) of a yellow solid. ICP-Dig: sodium (127), potassium (10.1 ppm), zinc (2.6 ppm), calcium (15 ppm), aluminum (2.5 ppm), iron (10.6 ppm), titanium (1.3 ppm), phosphorus (7.5 ppm); IC-Extract: sulfates (6.5 ppm), chlorides (8.6 ppm), phosphates (<0.5 ppm), nitrates (<0.5 ppm), nitrites (<0.5 ppm).

The purification methods of Examples 11-13 are summarized in Table 5. The BPA-TA intermediate is ring-closed with a catalytic amount of acid to prepare BPA-DA in o-DCB. A solution of aqueous sodium bicarbonate is used to wash the homogenous dianhydride solution and remove ionic species. Follow-up water washes then remove residual sodium bicarbonate from the organic layer. In this manner, sodium and sulfate (from sulfuric acid quenching of the tetraacid) are removed to levels below 3 ppm. Example 13 below shows that washing with saturated aqueous sodium bicarbonate removes nearly all sulfate and chloride. However, when insufficient water is used in follow-up washes, then sodium may remain in the form of sodium bicarbonate as a contaminant.

TABLE 5

| Ex. No. | BPA-TA | | BPA-DA | | |
|---|---|---|---|---|---|
| | Sodium (ppm) | Sulfate (ppm) | Purification Method | Sodium (ppm) | Sulfate (ppm) |
| 11 | 72 | 542 | Wash with 8.25 wt % aq. $NaHCO_3/H_2O$ | 1.6 | 2.4 |
| 12 | 274 | 1,208 | Wash with 2.2 wt % $NaHCO_3/H_2O$ | 1.7 | 0.56 |
| 13* | 269 | 1,082 (sulfate) 4,017 (chloride) | Wash with saturated aq. $NaHCO_3/H_2O$ | 127 | 6.5 (sulfate) 8.6 (chloride) |

*Denotes comparative example

Example 14

To a solution of N,N'-Ph-BPA-BI (mixture of 93.55 mol % N,N'-Ph-3,3'-BPA-BI and 5.73 mol % N,N'-3,4'-BPA-BI isomers) in o-DCB (350 kg at 25.78 wt % solids) was added DI water (383 kg). The reactor was agitated at 90% power with a nitrogen purge while continuing to heat to 90-95° C. internal temperature. A solution of 50% aqueous NaOH (65.73 kg, 821.6 mol, 6.11 equiv) was then added to V-106. The contents (799 kg) were then sealed with the nitrogen regulator set to 10 psig and heated over the next three hours until the internal pressure reached 135 psig (180° C.). The pressure was maintained at 135 psig for an additional six hours with agitation, and then the contents were cooled to 85-90° C. Subsequently, the vessel was carefully depressurized to 2 psig after which a sample was taken for stoichiometry determination. UPLC analyses indicated bisimide (4.3 mol %) was still present. As a result, additional 50% aqueous NaOH (5.45 kg, 68.13 mol, 0.51 equiv, 6.62 equiv total) was added to the mixture (804 kg total). The contents were again sealed with the nitrogen regulator set to 10 psig and reheated over the next three hours until the internal pressure reached 135 psig (180° C.). The pressure was maintained at 135 psig for an additional three hours with agitation, and then the contents were cooled to 85-90° C. Subsequently, the reactor was carefully depressurized to 2 psig and a UPLC sample of the mixture showed that the hydrolysis was complete.

Agitation was ceased, and the layers were allowed to separate over 90 minutes while maintaining an internal temperature of 85-90° C. The bottom (o-DCB/aniline) layer was drained within 20 minutes and discarded to waste until 502 kg remained in the reactor. At this point the reaction vessel contained the top ($H_2O$/BPA-TA.4Na) layer at 19.4 wt % solids. The reactor's tempered oil was then heated to 140° C. (120-125° C. internal temperature) with 50% agitation.

A hold tank was charged with DI water, which was then heated to 95° C. internal temperature and sent to the hydrolysis vessel as needed to maintain 400 kg weight (25.5 abs wt % solids) in the reactor as the azeotrope distilled out. Overheads were monitored every 30 minutes for the presence of aniline. Agitation was reduced to 20% power and the tempered oil was reduced to 120° C. Removal of the aniline byproduct was deemed sufficient when UPLC analysis of the reactor bottoms showed only 0.13 mol % aniline present. A total of 360 kg of DI water was used in the azeotropic removal of aniline. Additional DI water (50 kg) was added to the vessel (453 kg total mass) to keep the BPA-TA.4Na dissolved. A large sample (3.151 kg) was removed for further studies. Pan solids test revealed 21.34 abs wt % solids to provide an estimated yield of 96% (21.34%×453/100.76 kg expected) from the bisimides. Next, the solution was transferred from to a second vessel and maintained at 90° C. with agitation.

A quench vessel was charged with DI water (84 kg), agitated without heat, and then charged with 50% aqueous $H_2SO_4$ (96.00 kg, 489.4 mol, 3.820 equiv) via a Teflon-lined drum pump with a PVC flexible hose. The transfer lines were subsequently flushed with DI water (15 kg) and sent into the quench vessel with 50% agitation. Next, the quench vessel was heated to 90° C. internal temperature. The contents of the tetraacid-tetra sodium salt vessel (450 kg, 82.6 kg dry weight BPA-TA.4Na) were then transferred into the quench vessel over 45 minutes. Next, the vessel was rinsed with DI water (35 kg) and the rinse was likewise sent to the quench vessel (640 kg total mass at 90° C.). Agitation of the white slurry was then gradually increased to 80% power. After a total quench time of two hours, the quench vessel was cooled to 78° C. internal temperature and then the tempered oil was valved out. At this point, a sample was found to be a non-tacky free-flowing white slurry.

A Teflon-lined flexible hose and fittings with the appropriate compatible material of construction were used to transfer the slurry from the quench vessel to an unheated 40-liter Nutsche filter, containing a 60 micrometer Teflon filter media filter media. Under 50 psig, the liquid was separated from the solids in the Nutsche filter and the filtrate was sent into a polypropylene tote. It was noted that the first filtrate was a clear and colorless liquid with a pH value of 1.08. After the filtration was completed, the transfer process was repeated until the product cake filled the bottom section of the Nutsche filter. The filter was then depressurized.

Water was subsequently transferred from a hold tank at 50 psig to the Nutsche filter to wash the product cake. As before, the system was pressurized, and the filtrate was sent into a polypropylene tote. The washing process with DI water was repeated twice more, until the filtrate pH was above 3. This isolation process was repeated until all material from the quench vessel was collected. A total of 90.05 kg wet cake of BPA-TA isomers was collected (65.68 kg dry weight) to provide an estimated yield of 92.1% for hydrolysis/quench steps. ICP-Dig: sodium (108), potassium (6 ppm), zinc (1.4 ppm), calcium (3 ppm), aluminum (0 ppm), iron (5 ppm), titanium (0 ppm), phosphorus (6.3 ppm); IC-Total: sulfates (825 ppm), chlorides (728 ppm), phosphates (<20 ppm), nitrates (1,409 ppm), nitrites (231 ppm).

A reactor was charged with both the combined BPA-TA wet cakes (65.68 kg dry weight basis, 118.0 mol) and o-DCB (348 kg). Nitrogen was applied, the mixture (15 wt % solids with respect to BPA-DA) was agitated, and then the reactor's tempered oil was heated to 200-205° C. to drive off water and ring close. The mixture was then allowed to concentrate from 414 kg to a total mass of 312 kg (20 wt % solids). This level was maintained by adding fresh o-DCB as needed. After six hours, pan solids analysis showed 18.33 wt % solids and UPLC analysis indicated that ring-closure was complete. The mixture was then concentrated further to 290 kg (20 wt % solids) and cooled to 83-85° C. with agitation.

A hold tank was charged with DI water (181 kg) with agitation followed by sodium bicarbonate (6.94 kg) to make a 3.7 wt % aqueous $NaHCO_3$ solution. The sodium bicarbonate solution was heated to 83-85° C. internal temperature. Agitation of the BPA-DA solution was briefly discontinued while a portion of the aq. bicarbonate solution (125 kg) was transferred to into the vessel. Next, the biphasic mixture (422 kg total mass) was agitated at 90-100% power for 30 minutes while maintaining an internal temperature of 83-85° C. After a few minutes, a sample was taken, and the top aqueous layer measured a pH of 8.25. Agitation was discontinued, and the layers were allowed to separate for 45 minutes. The bottom layer, containing BPA-DA isomers in o-DCB, was transferred to a second vessel, and maintained at 83-85° C. (internal temperature) with agitation until the level of first vessel dropped to 128.5 kg. The top aqueous layer remaining was then drained to waste. Afterwards, empty first vessel was rinsed and cleaned with DI water and drained. At this point, the total contents of second vessel were determined to be 290 kg.

The hold tank was drained of aq. $NaHCO_3$, then rinsed and cleaned with DI water. Next, it was charged with DI water (187 kg) and heated to 83-85° C. internal temperature. Afterwards, the contents of the second tank were transferred to the first tank with agitation and heated to 83-85° C. internal temperature. Next, DI water (125 kg) from the hold tank was also transferred to the first tank to give a total vessel weight of 412.5 kg. Subsequently, the biphasic mixture was agitated at 90-100% power for 25 mins A sample was taken, and it was determined that the top aqueous layer measured a pH of 3.0. Agitation was discontinued, and the layers were allowed to separate for one hour. The light-yellow bottom (organic) layer was transferred back into the second vessel until the mass in the first vessel fell to 131 kg. At this point, the mass in the second vessel was observed to be 297.5 kg. The slurry contents of the second vessel were maintained at 83-85° C. internal temperature with agitation.

The aq. wash remaining was sent through a bag filter to a waste tote. Inspection of the bag filter revealed several kilograms of captured BPA-TA cake. The empty first vessel was rinsed and cleaned with DI water and then drained. Afterwards, the material in the second vessel was transferred back into the first vessel along with the captured BPA-TA cakes from the bag filter and the vessel was maintained at 83-85° C. internal temperature with agitation. The second vessel was also rinsed with additional o-DCB (50 kg) which was likewise transferred into the first vessel. Finally, the second vessel was rinsed and cleaned with fresh o-DCB and drained.

Pre-Mott Filtration: ICP-Dig: sodium (321), potassium (6 ppm), zinc (2 ppm), calcium (3 ppm), aluminum (0 ppm), iron (10 ppm), titanium (0 ppm), phosphorus (9 ppm); IC-Extract: sulfates (101.2 ppm), chlorides (0 ppm), phosphates (0 ppm), nitrates (0 ppm), nitrites (0 ppm).

Prior to Mott filtration, the second vessel was first prepared by heating until the internal temperature reached 95-105° C. The tempered oil on the first vessel, containing a mixture of BPA-DA isomers and carboxylic acid precursors was heated to 200-205° C. with 40% agitation to ring-close all species present. The contents were then concentrated to 267 kg (23 wt % solids), after which a sample of the overheads indicated 0 ppm of water was present. Pan solids revealed the solution was 18.51 wt % solids when and the vessel measured 278 kg. UPLC analysis showed only BPA-DA isomers and trace 3,3'-BPA-anhydride diacid (3,3'-BPA-AnhDA) present. The solution was therefore cooled to 95-105° C. internal temperature while the 2 micrometers Mott filter was heated to 95-105° C. The contents were subsequently sent through the Mott filter and into the cleaned second vessel to remove any residual inorganic species present. Afterwards, the filtrate was maintained at 95-105° C. internal temperature with 50% agitation. Next, the first vessel was rinsed with fresh o-DCB (60 kg) and the rinse was likewise transferred to the second vessel via the Mott filter. At this point, a sample of the combined filtrates (332 kg total vessel weight) was taken and determined to be 15.93 wt % solids to provide an estimated 86.1% yield (15.93%×332 kg/61.4 kg expected) for the ring-closure step. Finally, the filtrate was concentrated to 320 kg (17.32 wt % solids).

Post-Mott Filtration: ICP-Dig: sodium (111), potassium (6 ppm), zinc (3 ppm), calcium (3 ppm), aluminum (1 ppm), iron (6 ppm), titanium (0 ppm), phosphorus (10 ppm); IC-Extract: sulfates (20.1 ppm), chlorides (<0.5 ppm), phosphates (<0.5 ppm), nitrates (<0.5 ppm), nitrites (<0.5 ppm).

The concentrated solution of BPA-DA isomers in o-DCB was cooled to 25-40° C. internal temperature with increased agitation and held for two hours. Afterwards, a visual inspection helped to confirm that crystallization had occurred. Next, the slurry was heated to an internal temperature of 58-60° C. A Teflon-lined flexible hose and fittings with the appropriate compatible material of construction were used to transfer the slurry to an unheated 40-liter Nutsche filter, containing a 60 micrometer Teflon filter media. Under 50 psig, the liquid was separated from the solids in the Nutsche filter and the filtrate was sent into a carbon steel drum. After the filtration was completed, the transfer process was repeated until the product cake filled the bottom section of the Nutsche filter. The filter was then depressurized, and the cake was removed. This isolation process was repeated until all product solids were collected. A total of 49.4 kg (80.4% yield from BPA-TA isomers) was collected as a white solid. The overall yield of dianhydrides from BPA-bisimides was calculated to be 74.1%. UPLC: BPA-DA isomers+BPA-AnhDA (100%); ICP-Dig: sodium (18 ppm), potassium (6 ppm), zinc (1 ppm), calcium (1 ppm), aluminum (0 ppm), iron (0 ppm), titanium (0 ppm), phosphorus (10 ppm); IC-Extract: sulfates (6.14 ppm), chlorides (31.51 ppm), phosphates (<0.5 ppm), nitrates (<0.5 ppm), nitrites (<0.5 ppm).

Example 15

To the hydrolysis vessel containing N,N'-Ph-BPA-BI (mixture of 93.09 mol % N,N'-Ph-3,3'-BPA-BI and 4.38 mol % N,N'-3,4'-BPA-BI isomers) in o-DCB (293 kg total mass at 28.74 wt % solids) at 80° C., was added DI water (292 kg). The reactor was agitated at 90% power with a nitrogen purge. A solution of 50% aqueous NaOH (55.24 kg, 690.5 mol, 5.5 equiv) was then added to make a total reactor mass of 641 kg. The vessel was sealed with the nitrogen regulator set to 10 psig. The contents were heated until the internal pressure reached 122 psig (171-172° C.). The pressure was maintained at 120 psig for an additional six hours with agitation, and then the contents were cooled 85-90° C. The vessel was carefully depressurized to 2 psig after which a stoichiometry sample was taken. UPLC analyses indicated that the orange aqueous layer contained only BPA-TA, aniline, and trace impurities, while the white organic layer still showed trace BPA-BI.

Additional 50 wt % aq. NaOH (5.02 kg, 62.7 mol, 0.50 equiv, 6.0 equiv total charged) was added. As before, the reactor was sealed, then heated with agitation to 120 psig (172° C.). After an additional four hours at 120 psig, the contents were cooled to 90° C. and held overnight. After depressurizing safely to 2 psig, a second stoichiometry sample was taken. UPLC indicated that the hydrolysis was complete, and the aqueous layer was still orange in color. Agitation was halted, and the layers were allowed to separate for one hour. The bottom (o-DCB/aniline) layer was discharged to waste until 416.5 kg remained (413 kg predicted) in the hydrolysis vessel. It was noted that a clean separation occurred. At this point the top ($H_2$OBPA-TA.4Na) layer (416.5 kg, 21 wt % solids) remained. The tempered oil of the hydrolysis vessel was then heated to 120-125° C. with 50% agitation.

A hold tank was charged with DI water, which was then sent to the hydrolysis vessel as needed to maintain 413 kg weight as the azeotrope distilled out. The overheads were monitored every 30 minutes for the presence of aniline After a total of 337 kg of water had transferred from the hold tank, analysis of the overheads showed only 15 ppm of aniline present. The contents of the hydrolysis vessel (404 kg) were then held overnight at 90° C. with agitation. The next morning, the solution was transferred to a second vessel and maintained at 85-90° C. with agitation.

The quench vessel was charged with DI water (81 kg), agitated, and then charged with 50% aqueous $H_2SO_4$ (81.26 kg, 414.3 mol, 3.3 equiv) via a Teflon-lined drum pump with a PVC flexible hose into the add hopper. The transfer lines were then flushed with DI water (15 kg) and sent into the quench vessel. Subsequently, the vessel was heated to 85-90° C. with 50% agitation. The aqueous solution of BPA-TA.4Na was next transferred into the quench vessel over 45 minutes, followed by a rinsed with DI water (40 kg) to give a total mass of 615 kg. The agitation rate was then gradually increased to 80% power while heating to 90-95° C. After two hours, the mixture was too viscous to collect a sample. Agitation was increased to 100% and the contents were held for two hours longer at 90° C., after which a sample was found to be a non-tacky free-flowing white suspension. The tempered oil for the quench vessel was valved out and the contents were allowed to cool overnight prior to filtration. After 22 hours, the internal temperature reached 69° C. and the slurry was ready to filter.

A Teflon-lined flexible hose and fittings with the appropriate compatible material of construction were used to transfer the slurry form the quench vessel to the 40-liter Nutsche filter, containing a 60 micrometer Teflon filter media. Under 50 psig, the liquid was separated from the solids in the Nutsche filter and the filtrate was sent into a polypropylene tote. After the filtration was completed, the transfer process was repeated until the product cake filled the bottom section of the Nutsche filter. The filter was then depressurized.

A hold tank was cleaned and filled with DI water, heated to 80-85° C., and then pressurized to 50 psig. Water was then transferred from the hold tank to the Nutsche filter to wash the product cake. As before, the system was pressurized, and the filtrate was sent into a polypropylene tote. The washing process with DI water was repeated a second time. The combined aqueous waste was neutralized immediately to pH of 6-9. This isolation process was repeated multiple times until all BPA-TA solids were collected. The wet cakes were transferred into foil pans and dried in a vacuum oven at 90-95° C. under nitrogen for 16 hrs. A total of 56.162 kg of BPA-TA isomers was collected to provide a yield of 80.39% for hydrolysis/quench. ICP-Dig: sodium (274 ppm), potassium (2.7 ppm), zinc (1.5 ppm), calcium (3.2 ppm), aluminum (0 ppm), iron (7.7 ppm), titanium (0 ppm), phosphorus (8.3 ppm); IC-Total: sulfates (1,208 ppm), chlorides (671 ppm), phosphates (<20 ppm), nitrates (530 ppm), nitrites (128 ppm); UPLC: 3,3'-BPA-TA (94.84 mol %), 3,4'-BPA-TA (2.91 mol %).

A vessel was charged with both o-DCB (296 kg) and the combined BPA-TA dried cakes (55.89 kg, 100.4 mol). Nitrogen was applied, the mixture (352 kg, 15 wt % solids with respect to BPA-DA) was agitated, and then heated to 182-187° C. After 2.5 hrs. the vessel reached the target temperature. The solution was then allowed to concentrate to a total mass of 317 kg (16.5 wt % solids) and maintained at this level by adding fresh o-DCB as needed. After six hours at 182° C., Karl-Fisher analysis showed the overheads contained 127 ppm of water, while UPLC analysis of the reactor bottoms showed 94.6 mol % of BPA-DA isomers. The temperature of the vessel was then adjusted to 100° C. and blocked in for overnight agitation.

A hold tank was charged with DI water (95.4 kg) followed by sodium bicarbonate (0.963 kg) to make a 1.0 wt % aqueous NaHCO$_3$ solution. Next, the aq. NaHCO$_3$ was heated to 85-90° C. while the contents of the dianhydride solution were cooled to 85-90° C. A portion of the aq. bicarbonate solution (64.2 kg) was then transferred into the ring-closure vessel which was maintained at 80-90° C. At this point, the biphasic mixture weighed 400 kg. The contents were mixed for 10 minutes at 90-100% agitation, whereupon the pressure only reached 1.4 psig. A sample was taken and the top (aqueous) layer was found to have a pH of 8. Afterwards, agitation was halted, and the layers were allowed to separate for two hours. The bottom layer, containing BPA-DA isomers in o-DCB, was subsequently transferred to a second vessel, and maintained at 85-90° C. with agitation until the level of the ring-closure vessel reached 62 kg. The top aqueous layer remaining was then drained to waste. The total contents of second vessel were determined to be 357 kg. The aq. NaHCO$_3$ was drained from the hold tank, which was then rinsed and cleaned with DI water. Next, the hold tank was charged with DI water (300 kg) and heated to 85-90° C. Afterwards, the contents of the second vessel were transferred back into the first vessel with agitation and heating to 85-90° C. Next, DI water (125 kg) was transferred to the first vessel from the hold tank to give a total vessel weight of 442 kg. The mixture was agitated at 90-100% power for 10-15 minutes, after which agitation was discontinued. The layers were allowed to separate over 30 minutes, upon which the yellow bottom (organic) layer was transferred back into the second vessel until the mass (clear colorless aq. layer) in the first vessel fell to 125 kg. The mass in the second vessel was observed to be 342 kg. The aq. wash remaining in the first vessel was measured to have a pH value of 4-5 and was discarded into an appropriate waste disposal container. Meanwhile, the contents of the second vessel were maintained at 85-90° C. with agitation. Once the first vessel was empty, the material in the second vessel was transferred back into the first vessel, with a wash of fresh o-DCB (40 kg) and maintained at 85-90° C. with agitation.

DI water (107 kg) was transferred to the mixture from the hold tank and then agitated at 90-100% power for 10-15 mins. Agitation was discontinued, and the layers were allowed to separate over 60 minutes. The yellow bottom (organic) layer was transferred back into the second vessel until an emulsion layer was reached. UPLC analysis of the bottom (organic layer) showed the presence of 3,3'-BPA-AnhDA (14.18 mol %), but no 3,3'-BPA-TA. The emulsion was isolated (8 kg), separated in the laboratory, and the bottom layer (4 kg) was retained. The top aqueous layer (109 kg) in the first vessel was drained to a waste tote affixed with a sock filter. It was observed that the filter captured 19.94 kg of a wet cake which was comprised mostly of 3,3'-BPA-TA. The contents of the second vessel were then transferred back into the empty first vessel with the solids captured from the sock filter and the organic layer separated from the emulsion. Thenceforth, the contents were heated to 180-185° C. with agitation to drive off water and ring-close any BPA-TA present. The second vessel was also rinsed with additional o-DCB (40 kg), which was transferred into the first vessel. The contents were heated until overheads showed <30 ppm of water present, whilst concentrating to 193 kg. At this point, a pan solids test showed 16.4 abs wt % solids present (31.65 kg of BPA-DA isomers).

A copious amount of solids was found left behind in the second vessel. This vessel was charged with o-DCB until the mass inside reached 400 kg. The vessel was heated to 180° C. to ring-close any BPA-TA which may have been present. After a few hours, the contents were cooled to 150° C. and held over the weekend. The contents were then reheated to 182-185° C. until the overheads showed 107.4 ppm of water present by Karl-Fisher analysis. UPLC confirmed that all BPA-TA was ring-closed to BPA-DA. Afterwards, the contents were transferred to the first vessel which was maintained at 185° C. and concentrated to 298 kg, then cooled to 170° C. and held overnight. A sample of the vessel showed BPA-DA isomers (93.7 mol %) and BPA-AnhDA (4.45 mol %) present. Pan solids determined the concentration to be 15.11 wt % solids (45.03 kg BPA-DA of 52.27 kg expected) for an anticipated yield of 86.1% from BPA-TA. ICP-Dig: sodium (15 ppm), potassium (12 ppm), zinc (4.7 ppm), calcium (7.8 ppm), aluminum (1.8 ppm), iron (18 ppm), titanium (0 ppm), phosphorus (22 ppm); IC-extract: chlorides (3.01 ppm), sulfates (14.65 ppm), phosphates (1.3 ppm), nitrates (<0.5 ppm), nitrites (<0.5 ppm).

The BPA-DA solution in o-DCB was then cooled to 160° C. whilst the second vessel was cleaned with o-DCB and drained. Afterwards, the dianhydride solution was sent to the second vessel via the 2 micrometer Mott filter to remove any residual inorganic species present. Next, the first vessel was cleaned with water and drained. The filtrate in the second vessel was maintained at 170° C. and held overnight with agitation. Finally, the filtrate was sent back to the first vessel, followed by a wash with fresh o-DCB (40 kg), and heated to 180-185° C. After concentrating the dianhydride solution to 300 kg, a pan solids test showed 14.53 wt % solids (43.58 kg BPA-DA of 52.27 kg expected) for an estimated yield of 83.4% from BPA-TA. Post-Mott: ICP-Dig: sodium (12.0 ppm), potassium (10 ppm), zinc (3.7 ppm), calcium (1.7 ppm), aluminum (4.7 ppm), iron (19 ppm), titanium (0 ppm), phosphorus (23 ppm); IC-Extract: sulfates (2.74 ppm), chloride (45.8 ppm), phosphates (<0.5 ppm), nitrates (<0.5 ppm), nitrites (<0.5 ppm); UPLC: 3,3'-BPA-DA (95.22 mol %), 3,4'-BPA-DA (2.34 mol %), 3,3'-BPA-Anhydridediacid (0.85 mol %).

The solution was then concentrated to 231 kg at 185° C. followed by cooling to 120° C. to give an 18.8 wt % solids solution. This dianhydride solution was used directly in a polymerization trial without isolating the BPA-DA solids. The procedure described in Example 2 was followed to prepare a poly(etherimide) from 4,4'-DDS using phthalic anhydride as a chain stopper. The polymer was extruded to make pellets. GPC: weight average MW=55,567; Mn=25,477; PDI=2.18; Mz/Mw=1.56; ICP-Dig: sodium (1.9 ppm), potassium (6.7 ppm), zinc (6.4 ppm), calcium (0 ppm), aluminum (0 ppm), iron (14.3 ppm), titanium (0 ppm), phosphorus (11 ppm); IC-Extract: sulfates (22.2 ppm), chlorides (7.98 ppm), phosphates (<0.5 ppm), nitrates (<0.5 ppm), nitrites (<0.5 ppm); DSC Tg: 261.4° C.

The purification methods of Examples 14 and 15 are summarized in Table 6. The BPA-TA intermediate is ring-closed to prepare BPA-DA in o-DCB. A solution of aqueous sodium bicarbonate is used to wash the homogenous dianhydride solution and remove ionic species. Subsequent water washes then remove residual sodium bicarbonate from the organic layer, which is then followed by filtration. In this manner, sodium and sulfate (from sulfuric acid quenching of the tetraacid) are removed to very low levels. The higher sodium content (post-filtration) shown in Example 14 is attributed to contamination by an improperly cleaned vessel.

the mixture was held over the weekend. The vessel was carefully depressurized to 2 psig and a sample was taken. UPLC analysis indicated that the hydrolysis was complete. A wash vessel was charged with o-DCB (130 kg), agitated, and heated to 75-80° C. The aqueous solution of BPA-TA.4Na was transferred into the wash vessel, agitated at 50% power for 30 minutes, then the layers were allowed to separate. After 45 minutes, the bottom layer, containing o-DCB and aniline, was drained to waste. The top layer, containing BPA-TA.4Na in water, remained heating at 75-80° C. The empty hydrolysis vessel was charged with o-DCB (130 kg) and heated to 75-80° C. The contents of were then transferred into the wash vessel, as well as DI water (40 kg) used to wash the hydrolysis vessel. The wash vessel was agitated at 50% power, 75-80° C., for 30 minutes and then the layers were allowed to separate. After sitting overnight, the bottom layer, containing o-DCB and aniline, was drained to waste. The top layer, containing a solution of BPA-TA.4Na in water, remained which had a total mass of 371 kg. The contents of the wash vessel were then held at 70-80° C. with 40% agitation power. DI water (30 kg) was added and the contents were heated to 90° C.

A quench vessel was charged with DI water (81.7 kg), agitated, then charged with 50% aqueous $H_2SO_4$ (122.5 kg, 624.5 mol, >6 equiv) via a Teflon-lined drum pump with a PVC flexible hose. The transfer lines were flushed with DI water (15.8 kg) and sent into the quench vessel to achieve a total mass of 220 kg. The aq. $H_2SO_4$ was then heated to 85-90° C. with 70% agitation power prior to quench.

The aqueous solution in of BPA-TA.4Na in the wash vessel, held at 85-90° C., was transferred to the quench vessel over the course of 45 minutes. The wash vessel was then rinsed with DI water (60 kg), reheated to 85-90° C., and the rinse was also sent into the quench vessel. Nearly 2 hours, 15 min after the transfer was complete, the agitation power was increased to 100%. After 45 minutes the milky mixture was agitated at 80% power. The quench reactor was blocked in at 90° C., and the contents were held overnight to ensure full protonation of carboxylate species. A sample of the contents was then visually inspected and showed good flow with no tackiness. The solids settled quickly from the aqueous media. Afterwards, the slurry was cooled down to 70-80° C.

TABLE 6

| Ex. No. | BPA-TA | | BPA-DA | | |
| --- | --- | --- | --- | --- | --- |
| | Sodium (ppm) | Sulfate (ppm) | Purification Method | Sodium (ppm) | Sulfate (ppm) |
| 14 | 108 | 825 | 1. Wash with 3.7 wt % $NaHCO_3/H_2O$<br>2. Mott filtration | 111 | 20 |
| 15 | 274 | 1,208 | 1. Wash with 1 wt % $NaHCO_3/H_2O$<br>2. Mott filtration | 12 | 2.7 |

Comparative Example 16

To a hydrolysis vessel containing N,N'-Ph-BPA-BI (mixture of 91.13 mol % N,N'-3,3'-BPA-BI and 5.47 mol % N,N'-3,4'-BPA-BI) in DI water (349 kg total mass), was added additional DI water (30 kg). The reactor was agitated at 70% power and heated to 90° C. with a nitrogen purge. A solution of 50% aqueous NaOH (45.79 kg, 572.4 mol, >5.5 equiv) was then added to make a total reactor mass of 424 kg. The vessel was sealed and heated for two hours until the internal pressure reached 130-135 psig (180° C.). The pressure was maintained at 130-135 psig for an additional five hours, and then the set temperature was adjusted down to 75-80° C. Agitation was also decreased to 60% power and A Teflon-lined flexible hose and fittings with the appropriate compatible material of construction was used to transfer the slurry to a 40-liter Nutsche filter, containing a 60 micrometer Teflon filter media. Under 50 psig, the liquid was separated from the solids in the Nutsche filter and the filtrate was sent into a polypropylene tote. After the filtration was completed, the transfer process was repeated until the product cake filled the bottom section of the Nutsche filter. The filter was then depressurized.

A hold tank was filled with DI water, heated to 90° C., and pressurized to 50 psig. Water was then transferred from the hold tank to the Nutsche filter, in a slow continuous stream, to wash the product cake. As before, the filtrate was sent into a polypropylene tote. The waste stream was monitored until a pH of 4 was obtained and the filtrate showed 70 ppm sodium ions present. The water flow was then halted, the filter was pressurized to 50 psig to remove most of the water, and the wet cake was finally transferred into a plastic drum. A total of 584 gallons of aqueous waste was generated for the first product cake (17.5 kg). Pan solids test showed the cake was 88.7 wt % solids.

The cake isolation procedure above was followed, except that DI water was introduced into the Nutsche filter at a much faster rate. Within two hours of flushing, the waste stream showed only 80 ppm of sodium present. After the filtrate was found to contain 40 ppm of sodium, the pH value of the aqueous waste was measured to be 3.5. The water flow was then halted, the filter was pressurized to 50 psig to remove most of the water, and the wet cake was finally transferred into a plastic drum. A total of 159 gallons of aqueous waste was generated for the second product cake (16.5 kg). Pan solids test showed the cake was 83.6% solids.

The cake isolation procedure above was followed, except that after the cake was formed, DI water (at 90° C.) was added to fill the Nutsche filter. The system was closed and allowed to soak for 30 minutes, and then the Nutsche filter was pressurized to remove the water. This batch-flushing protocol was repeated several times. After a total of 4-5 hours of batch-flushing, the aqueous filtrate contained 40 ppm of sodium and a pH value of 3.5. The water flow was then halted, the filter was pressurized to 50 psig to remove most of the water, and the wet cake was finally transferred into a plastic drum. The third product cake, weighing 8.0 kg, was 77.10% solids based on pan-solids test. A total of 42.0 kg of the white BPA-TA wet cake was isolated with an estimated dry mass of 35.49 kg. The combined wet cakes were used directly in the ring-closure step without further drying. ICP-Dig: sodium (81.5), potassium (5.3 ppm), zinc (2.4 ppm), calcium (12.3 ppm), aluminum (2.4 ppm), iron (2.4 ppm), titanium (0.6 ppm), phosphorus (6.8 ppm); IC-Total: sulfates (694 ppm), chlorides (2,903 ppm), phosphates (<20 ppm), nitrates (3,163 ppm), nitrites (383 ppm); UPLC: 3,3'-BPA-TA (92.68%) and 3,4'-BPA-TA (7.32%).

The combined BPA-TA wet cakes (35.49 kg dry basis, 63.77 mol) and o-DCB (348 kg) were charged into the ring-closure vessel to make an 8.7 wt % mixture. Nitrogen was applied, the mixture was agitated, and then the contents were heated to 182-187° C. After a few hours, the vessel reached the target temperature. Over the following 80 minutes, the mixture was allowed to concentrate to a total mass of 255 kg (13 wt % solids). At this point, all solids dissolved to form a yellow solution and a sample of the overheads was determined to contain 300 ppm of water by Karl-Fisher analysis. The reactor weight was maintained and after an additional 1 h, 10 min a sample of the overheads was determined to contain 132 ppm of water by Karl-Fisher analysis. The vessel temperature of was then adjusted to 160° C. and blocked in for overnight agitation. The following morning a sample showed that cyclization to BPA-DA was complete. Nevertheless, drying of the contents continued over the next six hours while maintaining reactor weight until a sample of the overheads was determined to contain 29 ppm of water by Karl-Fisher analysis. The temperature was then adjusted to 120° C. and blocked in for overnight agitation.

The contents were recirculated through the 2 micrometer Mott filter to remove trace metals present. After a total of 12 hours, the solution was sent to a preheated (120° C.) hold tank via the Mott filter. The ring-closure vessel was cleaned with additional o-DCB (10 kg) which was also sent to the hold tank via the Mott filter. A sample of the 275 kg filtrate showed it was 10.3 wt % solids.

The crystallization vessel was cleaned well with fresh o-DCB, drained, and then heated to 175° C. A flex hose was connected from the hold tank outlet to the Nutsche filter inlet. A second flex hose was connected from the Nutsche filter outlet to the crystallization vessel inlet. The flex hoses and Nutsche filter were then heated to 90-140° C. prior to transfer. The filtrate in the hold tank was then pressurized and sent through the Nutsche filter and into the crystallization vessel. Additional o-DCB (40-50 kg) was used to rinse the hold tank and was also sent into the crystallization vessel via the Nutsche filter.

Following the transfer, the final filtrate (305.5 kg) was agitated and heated to 170° C. After 10 minutes, a sample was taken and found to contain 8.06 wt % solids with an estimated 24.62 kg (74.2% yield) of product present. The solution was then heated to 185-187° C. and concentrated to 140 kg (17.6 wt % solids) over the next two hours. Heating was discontinued, and the solution was allowed to cool overnight with agitation. The vessel temperature reached 78° C. Heptane (40 kg) was then inerted with nitrogen and charged into the crystallization vessel, then agitated for 10 minutes. This was repeated two more times (120 kg heptane total). Once the addition was complete, the tempered oil on the crystallization vessel was closed to allow the reactor to cool down further and promote crystallization of the product.

After agitating the slurry for two days, the temperature reached 53° C. A sample was taken to visually observe a lack of tackiness and good flow properties. The Nutsche filter was cleaned with o-DCB (5 gal), dried, and affixed with a 60 micrometer Nomex filter media. Using Teflon-lined flexible hoses, the slurry was then transferred to the Nutsche filter with a slight nitrogen pressure and the first cake was formed as previously described. After pressurizing the Nutsche filter to remove solvent, fresh heptane was added to the cake and allowed to soak for 30 min. The heptane wash was removed with pressure and this was repeated once more. A total of three product cakes were made in this fashion, taking care to remove as much heptane wash as possible before drying. The wet cakes were placed into aluminum foil pans and dried in a vacuum oven at 140° C. (30 inches Hg) until a consistent mass was obtained. A total of 22.5 kg (67.8% yield) of BPA-DA isomers was obtained as an off-white solid. YI value: 21.1 (L=91.87, a=−2.72, b=12.20); DSC $_{(melt)}$=188.0° C.; UPLC: 3,3'-BPA-DA (96.50%), 3,4'-BPA-DA (0.64%), 3,3'-BPA-anhydride diacid(2.42%); ICP-Dig: sodium (0.9 ppm), potassium (4.3 ppm), zinc (3.3 ppm), calcium (10.5 ppm), aluminum (0.4 ppm), iron (33.2 ppm), titanium (0 ppm), phosphorus (5.3 ppm); IC-Extract: sulfates (14 ppm), chlorides (84.4 ppm), phosphates (<0.5 ppm), nitrates (<0.5 ppm), nitrites (<0.5 ppm).

The purification method of Examples 6 and 16 are summarized in Table 7. The BPA-TA intermediates, prepared from either nitric acid or sulfuric acid quenching of the BPA-TA.4Na salts, are ring-closed to prepare BPA-DA in o-DCB. The homogenous solutions were then Mott filtered (2 micrometer filter) and then crystallized from either o-DCB alone (Example 6), or heptane/o-DCB (Example 16). In this manner, sodium, nitrate, nitrite, sulfate, and chlorides are removed to very low levels.

TABLE 7

| | BPA-TA | | | BPA-DA | |
|---|---|---|---|---|---|
| Example | Sodium (ppm) | Anions (ppm) | Purification Method | Sodium (ppm) | Anions (ppm) |
| 6 | 109 | 3,000 (nitrate) 497 (nitrite) 3,913 (chloride) | 1. Distillation 2. Mott filtration 3. crystallization from o-DCB | <0.5 | <0.5 (nitrate) <0.5 (nitrite) <0.5 (chloride) |
| 16 | 81.5 | 901 (sulfate) 2,903 (chloride) | 1. Mott filtration 2. crystallization form heptane/o-DCB | 0.9 | 14 (sulfate) 84.4 (chloride) |

Comparative Example 17

The following procedure used 3,3'-BPA-TA which had the following profile: UPLC: BPoTA isomers (95.93%); ICP-Dig: sodium (37.1 ppm), potassium (13.9 ppm), zinc (4.9 ppm), calcium (17.3 ppm), aluminum (2.1 ppm), iron (16.6 ppm), titanium (<0.5 ppm), phosphorus (6.8 ppm); IC-Total: sulfates (176 ppm), chlorides (1,240 ppm), phosphates (<20 ppm)

In a 500 mL 2-neck round-bottom flask with an overhead stirrer, Dean-Stark trap, and condenser was placed ground 3,3'-BPA-TA (20.0 g, 35.9 mmol, 1 equiv), o-DCB (200 g, 154 mL), and sulfuric acid (0.05 g, 98 mass %, 0.50 mmol, 0.014 equiv). The mixture was placed in an oil bath at 69° C. under nitrogen and agitated at 150 rpm. The mixture was heated to 150° C. and after approximately one hour and 45 minutes, the distillate (7.34 g) of o-DCB/$H_2O$ was removed from the trap. Additional o-DCB (52.3 g) was added to rinse off the walls of the flask. After an additional 25 minutes, the reaction was allowed to cool to room temperature overnight. The following morning, the mixture was reheated to 150° C. with 180 rpm agitation. After approximately 90 minutes, UPLC analysis indicated that the reaction was complete.

The solution was then cooled to 70° C. and charged with heptane (200 mL). The contents were agitated for 45 minutes, then the slurry was filtered onto a medium-fritted glass funnel and rinsed with heptane (~100 mL) to provide 12.48 g of the dianhydride as an off-white to tan solid in 66.7% yield after drying in a vacuum oven at 96° C. UPLC: BPA-DA isomers+BPA-AnhDA (97.31%); ICP-Dig: sodium (26.8), potassium (17.8 ppm), zinc (2.8 ppm), calcium (13.1 ppm), aluminum (6.9 ppm), iron (13.9 ppm), titanium (<0.5 ppm), phosphorus (3.3 ppm); IC-Extract: sulfates (882 ppm), chlorides (2.5 ppm), phosphates (<0.5 ppm)

The purification method of Examples 14 and 17 are summarized in Table 8. The BPA-TA intermediate was ring-closed to prepare BPA-DA in o-DCB. When washing the solution with aq. $NaHCO_3$ and Mott filtration failed to give pure material (Example 14), the additional process of crystallization from o-DCB was successful. When the BPA-TA ring closure to form BPA-DA was catalyzed by sulfuric acid (Example 17), then crystallization of the dianhydride from heptane/o-DCB, failed to remove the sulfates to an acceptable level.

TABLE 8

| | BPA-TA | | | BPA-DA | |
|---|---|---|---|---|---|
| Example | Sodium (ppm) | Sulfate (ppm) | Purification Method | Sodium (ppm) | Sulfate (ppm) |
| 14 | 111 | 20 | Crystallization from o-DCB | 18 | 6 |
| 17* | 37.1 | 176 | Crystallization from heptane/o-DCB | 26.8 | 882 |

*Denotes comparative example

Example 18

A solution of 3,3'-BPA-DA (containing 70 ppm sodium, 58.55 ppm chlorides, and 154.46 ppm of sulfates) in o-DCB (118.21 g, 21.75 wt %) was charged into a 250 mL glass jar. Celite (10.05 g) was added and the mixture was heated to 100° C. with agitation for 30 minutes. Next, the mixture was hot filtered on a fine-fritted (4-5.5 micrometer) glass funnel. The filtrate was determined to be 20.85 abs wt % solids by pan solids test. ICP-Dig: sodium (0), potassium (10.3 ppm), zinc (8.8 ppm), calcium (8.1 ppm), aluminum (2.3 ppm), iron (2.2 ppm), titanium (1.8 ppm), phosphorus (11 ppm); IC-Extract: sulfates (0.76 ppm), chlorides (<0.5 ppm), phosphates (<0.5 ppm), nitrates (<0.5 ppm), nitrites (<0.5 ppm).

Comparative Example 19

The following example used the 3,3'-BPA-DA solution prepared in Example 7. A portion of the above 3,3'-BPA-DA solution (56.63 g, 22.20 wt % solids, 12.57 g dry weight) was placed in a 100 mL round-bottomed flask with a magnetic stir bar and Celite (9.3 g). The mixture was stirred at 90° C. for five minutes, then filtered through a medium-fritted (10-16 micrometer) glass funnel. The Celite was washed with ambient-temperature o-DCB (25 mL). The combined filtrates were concentrated to give 12.54 g (99.8% yield) of a yellow solid. ICP-Dig: sodium (84.5), potassium (8.2 ppm), zinc (2 ppm), calcium (13.5 ppm), aluminum (1.7 ppm), iron (3.1 ppm), titanium (<0.5 ppm), phosphorus (6.6 ppm); IC-Extract: sulfates (178.4 ppm), chlorides (5.3 ppm), phosphates (<0.5 ppm), nitrates (<0.5 ppm), nitrites (<0.5 ppm).

The purification methods of Examples 18 and 19 are summarized in Table 9. The prepared solution of BPA-DA in o-DCB is treated with an adsorbent and hot-filtered to remove contaminants. As shown in Comparative Example 18, sodium, chlorides, nitrates, nitrites, and sulfates are removed to levels below 1 ppm when the BPA-TA has fairly low ppm levels of these contaminants to begin with. As shown in Example 19, Celite removes the bulk of the ionic contaminants, but when very high levels are present in the BPA-TA, then additional purification methods may be required.

TABLE 9

| Ex. No. | BPA-TA | | | BPA-DA | |
|---|---|---|---|---|---|
| | Sodium (ppm) | Sulfate (ppm) | Purification Method | Sodium (ppm) | Anions (ppm) |
| 18 | 70 | 154 | Filtration with Celite (4-5.5 micrometer filter) | 0 | 0.76 (sulfate) <0.5 (chloride) <0.5 (nitrate) <0.5 (nitrite) |
| 19* | 269 | 1,082 | Filtration with Celite (10-16 micrometer filter) | 84.5 | 178.4 (sulfate) 5.3 (chloride) |

*Denotes comparative example

Example 20

The following procedure used 3,3'-BPA-DA with the following profile: ICP-Dig: sodium (4), potassium (13 ppm), zinc (5 ppm), calcium (7 ppm), aluminum (0 ppm), iron (0 ppm), titanium (0 ppm), phosphorus (6 ppm); IC-Extract: sulfates (1.4 ppm), chlorides (1.2 ppm), phosphates (<0.5 ppm), nitrates (0.9 ppm), nitrites (<0.5 ppm); UPLC: 100% pure desired material (BPA-DA isomers+BPA-AnhDA). To a 500 mL round-bottom flask under nitrogen with a mechanical stirrer, Dean-Stark trap, and condenser was added solid 3,3'-BPA-DA (26.414 g, 50.75 mmol, 0.9685 equiv), DDS (13.01 g, 52.40 mmol, 1.00 equiv), PA (0.660 g, 4.46 mmol, 0.0850 equiv), and o-DCB (151 g, 116 mL) all at once. The reaction flask was then placed in an oil bath at 150° C., and the nitrogen flow was increased with agitation at 90-100 rpm. The set temperature was then adjusted to 182-185° C. to concentrate the reaction.

It was observed that the glue-ball stage (e.g., when the pre-polymer becomes an inhomogeneous mass) was reached at 173-176° C. After glue-ball stage, agitation was increased to 250 rpm. After 30 minutes at 182-185° C., the reaction became a homogenous orange solution. After a total cycle time of one hour, the distillate of $H_2O$/o-DCB (66 g) was drained from the trap. At this point the reactor contents were estimated to be 30 wt % solids. The nitrogen flow was reduced, the heat tape was turned off, and the polymerization was stirred overnight at 182-185° C. After a total cycle time of 16 hours, the poly(ether imide) solution was poured into a pan to cool prior to Haake devolatization. GPC: weight average MW=45,860; Mn=19,495; PDI=2.35; Mz/Mw=1.60; ICP-Dig: sodium (14.8), potassium (13.9 ppm), zinc (8.8 ppm), calcium (27.8 ppm), aluminum (17.9 ppm), iron (7 ppm), titanium (0.6 ppm), phosphorus (21.1 ppm); IC-Extract: sulfates (5.3 ppm), chlorides (5.10 ppm), phosphates (<0.5 ppm), nitrates (<0.5 ppm), nitrites (<0.5 ppm); DSC Tg: 266° C.

Example 21

BPA-DA isomers prepared in Example 2 was used in the following process: ICP-Dig: sodium (2 ppm), potassium (5 ppm), zinc (0 ppm), calcium (0 ppm), aluminum (0 ppm), iron (0 ppm), titanium (0 ppm), phosphorus (12 ppm); IC-Extract: sulfates (10.06 ppm), chlorides (<0.5 ppm), phosphates (<0.5 ppm), nitrates (<0.5 ppm), nitrites (<0.5 ppm). A vessel was charged with o-DCB (132 kg) and BPA-DA isomers (43.73 kg dry wt basis, 84.01 mol) prepared above. The contents were heated to 105° C. with agitation, then phthalic anhydride (510 g, 3.44 mol) was added. The contents were held overnight under nitrogen. Next, the vessel was charged with m-PD (9.309 kg, 86.08 mol) and the internal temperature was raised to 130° C. After one hour, the internal temperature was adjusted to 180° C. After an additional two hours, a sample was taken for stoichiometric analysis. Corrections were made as necessary until the batch was 0-0.2 mol % excess dianhydride. Next, the material was sent through a Mott filter (2 micrometer) and into a second vessel while maintaining the solution at 180° C. The solution was concentrated to 35 wt % solids and then held at 140° C. overnight. The polymer solution was then extruded to make pellets. GPC: weight average MW=52,692; Mn=15,750; PDI=3.35; Mz/Mw=1.51; ICP-Dig: sodium (8), potassium (10 ppm), zinc (0 ppm), calcium (3 ppm), aluminum (0 ppm), iron (0 ppm), titanium (0 ppm), phosphorus (8 ppm); IC-Extract: sulfates (2.9 ppm), chlorides (0.9 ppm), phosphates (<0.5 ppm), nitrates (<0.5 ppm), nitrites (<0.5 ppm); DSC Tg: 268.7° C.

Comparative Example 22

The following procedure used 3,3'-BPA-TA which had the following profile: ICP-Dig: sodium (269 ppm), potassium (5.6 ppm), zinc (3.1 ppm), calcium (5.4 ppm), aluminum (0 ppm), iron (0 ppm), titanium (0 ppm), phosphorus (5.5 ppm); IC-Total: sulfates (1,082 ppm), chlorides (4,017 ppm), phosphates (<20 ppm). To a 250 mL round-bottom flask under nitrogen with a mechanical stirrer, Dean-Stark trap, and condenser was added solid 3,3'-BPA-TA (23.25 g, 41.78 mmol) and o-DCB (123 g). The contents were heated in an oil bath set to 200° C. with 200 rpm agitation. After one hour, 39.5 g of distillate was drained from the trap and the nitrogen flow was reduced to 0.5 scfh. After an additional hour, o-DCB (15 mL) was added to the homogenous yellow solution and it was allowed to cool to room temperature overnight.

4,4'-DDS (10.66 g, 42.9 mmol), PA (0.343 g, 2.32 mmol), and o-DCB (20 mL) were then charged and the flask was reheated to 200° C. The nitrogen flow was increased with agitation at 200 rpm. After heating the polymerization solution for 28 minutes, it was observed that the glue-ball stage was reached at 175-185° C. during which agitation was decreased to 120 rpm. After glue-ball stage, agitation of the homogenous yellow solution was increased to 200 rpm. After an additional 38 minutes, the oil bath temperature reached 196° C., and the distillate of $H_2O$/o-DCB (74.3 g) was drained from the trap. At this point the reactor contents were estimated to be 35 wt % solids. The nitrogen flow was reduced to 0.5 scfh. After a total of 5.5 hours, a sample was taken for stoichiometry. Additional 3,3'-BPA-DA (370 mg) was added with o-DCB (5 mL) and the contents were allowed to concentrate back to 35 wt % solids. The following morning, a second sample was taken for stoichiometry and additional 3,3'-BPA-DA (211 mg) and o-DCB (5 mL) were added to the flask. After a total polymerization time of 28 hours, the poly(etherimide) solution was poured into a pan to cool. A sample was devolatilized at 385° C. for 20 minutes. GPC: weight average MW=21,238; Mn=10,118; PDI=2.10; Mz/Mw=1.41; ICP-Dig: sodium (200), potassium (12.1 ppm), zinc (16.2 ppm), calcium (36.4 ppm), aluminum (5.2 ppm), iron (13.2 ppm), titanium (1.5 ppm), phosphorus (10.3 ppm); IC-Extract: sulfates (440.7 ppm), chlorides (13.6 ppm), phosphates (<0.5 ppm), nitrates (<0.5 ppm), nitrites (<0.5 ppm); DSC Tg: 256.9° C.

Table 10 shows that highly pure poly(etherimide)s can be prepared in o-DCB when using highly pure BPA-DA as a monomer (Examples 5, 20, and 21). However, when highly contaminated BPA-DA is used (comparative example 22), then the resulting poly(etherimide) will also have high levels of inorganic contaminants and lower thermal properties (Tg).

TABLE 10

| | BPA-DA | | Poly(etherimide) | | |
|---|---|---|---|---|---|
| Ex. No. | Sodium (ppm) | Anions (ppm) | Sodium (ppm) | Anions (ppm) | Tg |
| 5 | 2 | 10.1 (sulfate) | 2 | 9.7 (sulfate) | 266° C. |
| | | <0.5 (chloride) | | 1.8 (chloride) | |
| 20 | 4 | 1.4 (sulfate) | 15 | 5.3 (sulfate) | 266° C. |
| | | 1.2 (chloride) | | 5.1 (chloride) | |
| 21 | 2 | 10.1 (sulfate) | 8 | 2.9 (sulfate) | 268.7° C. |
| | | <0.5 (chloride) | | 0.9 (chloride) | |
| 22* | 269 | 1,082 (sulfate) | 200 | 441 (sulfate) | 256.9° C. |
| | | 4,017 (chloride) | | 13.6 (chloride) | |

*Denotes comparative example

Comparative Example 23

A 3-neck 250 mL round bottom flask with an overhead stirrer, Dean-Starke trap, and condenser was charged with N-Phenyl-3,3'-BPA-BI ($C_{43}H_{30}N_2O_6$)/N-Phenyl-3,4'-BPA-BI ($C_{43}H_{30}N_2O_6$) (96.5:3.5 ratio, 10.00 g, 14.91 mmol), 4 N aq. NaOH (14.91 mL, 4 equiv), and water (60 mL). The reaction mixture was heated in an oil bath at 105° C. After 7 hours, a sample showed all starting material was consumed and a mixture of N-Phenyl-3,3'-BPA-TAMA.3Na (2.98%) and N-Phenyl-BPA-DADA.2Na (97.02%) was present. After 17 hours, UPLC analysis indicated all starting material was consumed and a mixture of N-Phenyl-3,3'-BPA-TAMA.3Na (14.25%) and N-Phenyl-BPA-DADA.2Na (85.75%) was present. Water (10 mL) was drained from the trap and o-DCB (70 mL) was added to the reaction flask.

The temperature of the reaction mixture was raised to 115° C., after which 50% aqueous $H_2SO_4$ (17.55 g, 89.46 mmol) was added drop-wise. After the addition was complete, the temperature was raised further to 125° C. and stirring continued for three hours. The heat was removed, stirring was discontinued, and the layers separated within a few minutes. The top aqueous layer was discarded and fresh DI water (100 mL) was added to the flask. The mixture was stirred for one minute, then the layers were allowed to separate and the top aqueous layer was removed. The washing procedure with water was repeated several more times (6×100 mL) until the aqueous layer obtained a pH of 4. The organic layer was sampled and UPLC showed a mixture of 3,3'-BPA-DA (14.7%), N-Phenyl-3,3'-BPA-anhydrideimide (76.2%), and N-Phenyl-3,3'-BPA-BI (7.5%). ICP-Digest of this sample after removing solvent and washing with water showed 19 ppm Na, <5.0 ppm of K, <1.0 ppm of Zn, 3.6 ppm of Ca, 6 ppm of Al, <1.0 ppm of Fe, <1.0 ppm of Ti, and <10 ppm of P.

Additional o-DCB (100 mL) was added to the flask and the mixture began heating to 185° C. to remove the water and complete cyclization. After one hour, the temperature reached 180° C. The Dean-Stark trap was drained of the water/o-DCB (30 mL/42 mL) azeotrope, and most solids were dissolved in the light yellow solution. After an additional hour of heating, the flask was allowed to cool to room temperature. The mixture was filtered through a 2.7 μm Whatman GF/D glass microfiber filter paper to obtain a light yellow filtrate. UPLC analysis of the filtrate indicated a mixture of 3,3'-BPA-DA (15.6%), N-Phenyl-3,3'-BPA-anhydrideimide (75.5%), and N-Phenyl-3,3'-BPA-BI (7.3%). ICP-Digest of this sample after removing solvent showed no significant improvement in inorganic impurities. Stated another way, after filtering and re-analyzing this same, it was found that the filtration step did not further decrease the amounts of any impurities. The sample contained: 2.0 ppm of Na, <5.0 ppm of K, 16.7 ppm of Zn, 3.3 ppm of Ca, 4.5 ppm of Al, 1.9 ppm of Fe, <1.0 ppm of Ti, and <10 ppm of P.

This disclosure further encompasses the following aspects.

Aspect 1: A method for the purification of a bisphenol A dianhydride composition comprising a bisphenol A dianhydride of the formula

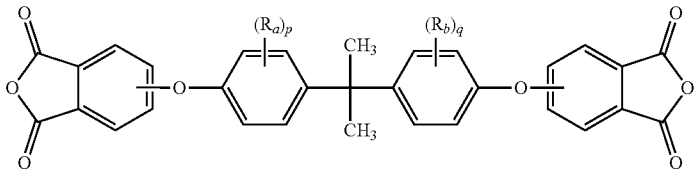

wherein $R^a$ and $R^b$ are each independently a halogen or a monovalent $C_{1-6}$ alkyl group and p and q are each independently an integer of 0 to 4, preferably wherein p and q are each 0; and at least one of sodium ions, potassium ions, calcium ions, zinc ions, aluminum ions, titanium ions, iron ions, phosphorus ions, phosphate ions, sulfate ions, chloride ions, nitrate ions, and nitrite ions; the method comprising: contacting the bisphenol A dianhydride composition with a halogenated solvent to form a solution; and one or more of: filtering the solution to remove ionic species; washing the solution with aqueous media to remove ionic species; crystallizing bisphenol A dianhydride from the solution to remove ionic species; and contacting the solution with an adsorbent to remove ionic species.

Aspect 2: The method of aspect 1, wherein the method includes filtering the solution, wherein the filtering comprises passing the solution through a filter having a pore size of less than or equal to 2 micrometers, preferably 0.2 to 0.45 micrometers.

Aspect 3: The method of aspects 1 or 2, wherein the method includes washing the solution with aqueous media, wherein the aqueous media comprises an aqueous caustic solution, preferably an aqueous sodium bicarbonate solution, more preferably an aqueous sodium bicarbonate solution having a concentration of 1 to 10 weight percent sodium bicarbonate, and optionally, subsequently washing the solution with water.

Aspect 4: The method of any one or more of aspects 1 to 3, wherein the method includes crystallizing the bisphenol A dianhydride from the solution wherein crystallizing bisphenol A dianhydride comprises optionally adding an antisolvent to the solution and cooling to a temperature effective to provide a slurry.

Aspect 5: The method of aspect 4, wherein the antisolvent is a non-polar solvent, preferably wherein the antisolvent comprises heptane, hexane, pentane, benzene, ligroin, or a combination thereof, more preferably wherein the antisolvent comprises heptane.

Aspect 6: The method of any one or more of aspects 1 to 5, wherein the method includes contacting the solution with the adsorbent, wherein the adsorbent comprises celite, diatomaceous earth, silica, alumina, or a combination thereof, and wherein the method further comprises filtering the solution comprising the adsorbent through a filter having a pore size of 16 micrometers or less, preferably 4 to 5.5 micrometers.

Aspect 7: The method of any one or more of aspects 1 to 6, wherein the halogenated solvent comprises ortho-dichlorobenzene, para-dichlorobenzene, meta-dichlorobenzene, trichlorobenzene, or a combination thereof.

Aspect 8: The method of any one or more of aspects 1 to 7, wherein the divalent bonds of the bisphenol A group are in the 3,3' position, the 3,4' position, or the 4,4' position, preferably the 3,3' position.

Aspect 9: The method of any one or more of aspects 1 to 8, wherein the bisphenol A dianhydride is an isomer mixture, preferably wherein 10-100 weight percent of the bisphenol A dianhydride have the divalent bonds of the bisphenol A group of the bisphenol A dianhydride are in the 3,3' position, more preferably wherein 90-100 weight percent of the bisphenol A dianhydride have the divalent bonds of the bisphenol A group of the bisphenol dianhydride are in the 3,3' position.

Aspect 10: A bisphenol A dianhydride made by the method of any of aspects 1 to 9, wherein the purified bisphenol A dianhydride comprises less than 25 ppm each of sodium ions, potassium ions, calcium ions, zinc ions, aluminum ions, titanium ions, iron ions, and phosphorus ions; and less than 50 ppm each of phosphate ions, sulfate ions, chloride ions, nitrate ions, and nitrite ions.

Aspect 11: The method of any one or more of aspects 1 to 9, wherein the bisphenol A dianhydride composition is made by a method comprising hydrolyzing a bisphenol A bisimide to form a corresponding bisphenol A tetraacid salt; contacting the bisphenol A tetraacid salt with a mineral acid to form a corresponding bisphenol A tetraacid; contacting the bisphenol A tetraacid with a halogenated solvent to form a reaction mixture; heating the reaction mixture to a temperature effective to form the corresponding bisphenol A dianhydride from the bisphenol A tetraacid, optionally in the presence of a mineral acid; and isolating the bisphenol A dianhydride from the reaction mixture; wherein the method is carried out in the absence of an organic acid, an organic anhydride different from the bisphenol A dianhydride, or both.

Aspect 12: A poly(etherimide) comprising repeating units derived from polymerization of the purified bisphenol A dianhydride composition made by the method of any of aspects 1 to 9 and an organic diamine, wherein the poly (etherimide) comprises less than 25 ppm each of sodium ions, potassium ions, calcium ions, zinc ions, aluminum ions, titanium ions, iron ions, and phosphorus ions and less than 25 ppm each of phosphate ions, sulfate ions, chloride ions, nitrate ions, and nitrite ions.

Aspect 13: The poly(etherimide) of aspect 12, wherein the organic diamine is 4,4'-diaminodiphenylsulfone, 3,4'-diaminodiphenylsulfone, 3,3'-diaminodiphenylsulfone, meta-phenylene diamine, para-phenylene diamine, ortho-phenylene diamine, or a combination thereof.

Aspect 14: An article comprising the poly(etherimide) of any one of aspects 12 to 14, preferably wherein the article is an optical component, more preferably a lens.

Aspect 15: A method for purification of a bisphenol A tetraacid composition comprising a bisphenol A tetraacid of the formula

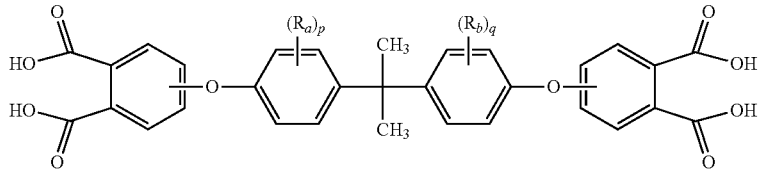

wherein $R^a$ and $R^b$ are each independently a halogen or a monovalent $C_1$-6 alkyl group and p and q are each independently an integer of 0 to 4, preferably wherein p and q are each 0; and at least one of sodium ions and sulfate ions; the method comprising: washing the bisphenol A tetraacid composition with water at a temperature of 85 to 95 degrees; optionally, agitating the composition during the washing; and collecting a purified bisphenol A tetraacid composition, preferably by centrifugation; wherein the purified bisphenol A tetraacid composition comprises less than 100 ppm, preferably less than 80 ppm, more preferably 0.1 to 75 ppm each of sodium ions, potassium ions, calcium ions, and less than 900 ppm, preferably less than 450 ppm, more preferably 0.1 to 425 ppm each of sulfate ions, phosphate ions, nitrate ions, and nitrite ions.

The compositions, methods, and articles can alternatively comprise, consist of, or consist essentially of, any appropriate materials, steps, or components herein disclosed. The compositions, methods, and articles can additionally, or alternatively, be formulated so as to be devoid, or substantially free, of any materials (or species), steps, or components, that are otherwise not necessary to the achievement of the function or objectives of the compositions, methods, and articles.

All ranges disclosed herein are inclusive of the endpoints, and the endpoints are independently combinable with each other (e.g., ranges of "up to 25 wt. %, or, more specifically, 5 wt. % to 20 wt. %", is inclusive of the endpoints and all intermediate values of the ranges of "5 wt. % to 25 wt. %," etc.). "Combinations" is inclusive of blends, mixtures, alloys, reaction products, and the like. The terms "first," "second," and the like, do not denote any order, quantity, or importance, but rather are used to distinguish one element from another. The terms "a" and "an" and "the" do not denote a limitation of quantity, and are to be construed to cover both the singular and the plural, unless otherwise indicated herein or clearly contradicted by context. "Or" means "and/or" unless clearly stated otherwise. Reference throughout the specification to "some embodiments", "an embodiment", and so forth, means that a particular element described in connection with the embodiment is included in at least one embodiment described herein, and may or may not be present in other embodiments. The term "combination thereof" as used herein includes one or more of the listed elements, and is open, allowing the presence of one or more like elements not named. In addition, it is to be understood that the described elements may be combined in any suitable manner in the various embodiments.

Unless specified to the contrary herein, all test standards are the most recent standard in effect as of the filing date of this application, or, if priority is claimed, the filing date of the earliest priority application in which the test standard appears.

Unless defined otherwise, technical and scientific terms used herein have the same meaning as is commonly understood by one of skill in the art to which this application belongs. All cited patents, patent applications, and other references are incorporated herein by reference in their entirety. However, if a term in the present application contradicts or conflicts with a term in the incorporated reference, the term from the present application takes precedence over the conflicting term from the incorporated reference.

Compounds are described using standard nomenclature. For example, any position not substituted by any indicated group is understood to have its valency filled by a bond as indicated, or a hydrogen atom. A dash ("-") that is not between two letters or symbols is used to indicate a point of attachment for a substituent. For example, —CHO is attached through carbon of the carbonyl group.

As used herein, the term "hydrocarbyl", whether used by itself, or as a prefix, suffix, or fragment of another term, refers to a residue that contains only carbon and hydrogen. The residue can be aliphatic or aromatic, straight-chain, cyclic, bicyclic, branched, saturated, or unsaturated. It can also contain combinations of aliphatic, aromatic, straight chain, cyclic, bicyclic, branched, saturated, and unsaturated hydrocarbon moieties. However, when the hydrocarbyl residue is described as substituted, it may, optionally, contain heteroatoms over and above the carbon and hydrogen members of the substituent residue. Thus, when specifically described as substituted, the hydrocarbyl residue can also contain one or more carbonyl groups, amino groups, hydroxyl groups, or the like, or it can contain heteroatoms within the backbone of the hydrocarbyl residue. The term "alkyl" means a branched or straight chain, unsaturated aliphatic hydrocarbon group, e.g., methyl, ethyl, n-propyl, i-propyl, n-butyl, s-butyl, t-butyl, n-pentyl, s-pentyl, and n- and s-hexyl. "Alkenyl" means a straight or branched chain, monovalent hydrocarbon group having at least one carbon-carbon double bond (e.g., ethenyl (—HC=CH$_2$)). "Alkoxy" means an alkyl group that is linked via an oxygen (i.e., alkyl-O—), for example methoxy, ethoxy, and sec-butyloxy groups. "Alkylene" means a straight or branched chain, saturated, divalent aliphatic hydrocarbon group (e.g., methylene (—CH$_2$—) or, propylene (—(CH$_2$)$_3$—)). "Cycloalkylene" means a divalent cyclic alkylene group, —C$_n$H$_{2n-x}$, wherein x is the number of hydrogens replaced by cyclization(s). "Cycloalkenyl" means a monovalent group having one or more rings and one or more carbon-carbon double bonds in the ring, wherein all ring members are carbon (e.g., cyclopentyl and cyclohexyl). "Aryl" means an aromatic hydrocarbon group containing the specified number of carbon atoms, such as phenyl, tropone, indanyl, or naphthyl. "Arylene" means a divalent aryl group. "Alkylarylene" means an arylene group substituted with an alkyl group. "Arylalkylene" means an alkylene group substituted with an aryl group (e.g., benzyl). The prefix "halo" means a group or compound including one more of a fluoro, chloro, bromo, or iodo substituent. A combination of different halo groups (e.g., bromo and fluoro), or only chloro groups can be present. The prefix "hetero" means that the compound or group includes at least one ring member that is a heteroatom (e.g., 1, 2, or 3 heteroatom(s)), wherein the heteroatom(s) is each independently N, O, S, Si, or P. "Substituted" means that the compound or group is substituted with at least one (e.g., 1, 2, 3, or 4) substituents that can each independently be a $C_{1-9}$ alkoxy, a $C_{1-9}$ haloalkoxy, a nitro (—NO$_2$), a cyano (—CN), a $C_{1-6}$ alkyl sulfonyl (—S(=O)$_2$-alkyl), a $C_{6-12}$ aryl sulfonyl (—S(=O)$_2$-aryl), a thiol (—SH), a thiocyano (—SCN), a tosyl (CH$_3$C$_6$H$_4$SO$_2$—), a $C_{3-12}$ cycloalkyl, a $C_{2-12}$ alkenyl, a $C_{5-12}$ cycloalkenyl, a $C_{6-12}$ aryl, a $C_{7-13}$ arylalkylene, a $C_{4-12}$ heterocycloalkyl, and a $C_{3-12}$ heteroaryl instead of hydrogen, provided that the substituted atom's normal valence is not exceeded. The number of carbon atoms indicated in a group is exclusive of any substituents. For example —CH$_2$CH$_2$CN is a $C_2$ alkyl group substituted with a nitrile.

While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

What is claimed is:

1. A method for the purification of a bisphenol A dianhydride composition comprising
a bisphenol A dianhydride of the formula

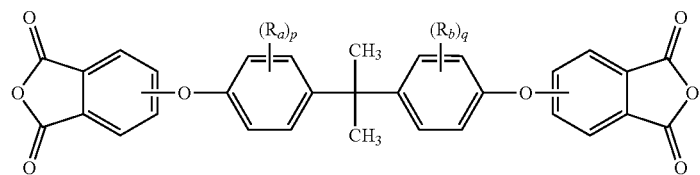

wherein $R^a$ and $R^b$ are each independently a halogen or a monovalent C₁₋₆ alkyl group and p and q are each independently an integer of 0 to 4; and
at least one of sodium ions, potassium ions, calcium ions, zinc ions, aluminum ions, titanium ions, iron ions, phosphorus ions, phosphate ions, sulfate ions, chloride ions, nitrate ions, and nitrite ions;
the method comprising:
contacting the bisphenol A dianhydride composition with a halogenated solvent to form a solution; and
one or more of:
filtering the solution to remove ionic species;
washing the solution with aqueous media to remove ionic species;
crystallizing bisphenol A dianhydride from the solution to remove ionic species; and
contacting the solution with an adsorbent to remove ionic species.

2. The method of claim 1, wherein the method includes filtering the solution, wherein the filtering comprises passing the solution through a filter having a pore size of less than or equal to 2 micrometers.

3. The method of claim 1, wherein the method includes washing the solution with aqueous media, wherein the aqueous media comprises an aqueous caustic solution, and optionally, subsequently washing the solution with water.

4. The method of claim 1, wherein the method includes crystallizing the bisphenol A dianhydride from the solution wherein crystallizing bisphenol A dianhydride comprises optionally adding an antisolvent to the solution and cooling to a temperature effective to provide a slurry.

5. The method of claim 4, wherein the antisolvent is a non-polar solvent.

6. The method of claim 1, wherein the method includes contacting the solution with the adsorbent, wherein the adsorbent comprises celite, diatomaceous earth, silica, alumina, or a combination thereof, and wherein the method further comprises filtering the solution comprising the adsorbent through a filter having a pore size of 16 micrometers or less.

7. The method of claim 1, wherein the halogenated solvent comprises ortho-dichlorobenzene, para-dichlorobenzene, meta-dichlorobenzene, trichlorobenzene, or a combination thereof.

8. The method of claim 1, wherein the divalent bonds of the bisphenol A group are in the 3,3' position, the 3,4' position, or the 4,4' position.

9. The method of claim 1, wherein the bisphenol A dianhydride is an isomer mixture.

10. A bisphenol A dianhydride made by the method of claim 1, wherein the purified bisphenol A dianhydride comprises
less than 25 ppm each of sodium ions, potassium ions, calcium ions, zinc ions, aluminum ions, titanium ions, iron ions, and phosphorus ions; and
less than 50 ppm each of phosphate ions, sulfate ions, chloride ions, nitrate ions, and nitrite ions.

11. The method of claim 1, wherein the bisphenol A dianhydride composition is made by a method comprising
hydrolyzing a bisphenol A bisimide to form a corresponding bisphenol A tetraacid salt;
contacting the bisphenol A tetraacid salt with a mineral acid to form a corresponding bisphenol A tetraacid;
contacting the bisphenol A tetraacid with a halogenated solvent to form a reaction mixture;
heating the reaction mixture to a temperature effective to form the corresponding bisphenol A dianhydride from the bisphenol A tetraacid, optionally in the presence of a mineral acid; and
isolating the bisphenol A dianhydride from the reaction mixture;
wherein the method is carried out in the absence of an organic acid, an organic anhydride different from the bisphenol A dianhydride, or both.

* * * * *